(12) United States Patent
Zetts

(10) Patent No.: US 7,177,520 B2
(45) Date of Patent: Feb. 13, 2007

(54) SYSTEM AND METHOD OF TIMECODE REPAIR AND SYNCHRONIZATION IN MPEG STREAMS

(75) Inventor: John Mark Zetts, Falls Church, VA (US)

(73) Assignee: IBM Corporation, Armonk, NY (US)

( * ) Notice: Subject to any disclaimer, the term of this patent is extended or adjusted under 35 U.S.C. 154(b) by 1372 days.

(21) Appl. No.: 09/850,253

(22) Filed: May 7, 2001

(65) Prior Publication Data

US 2002/0035732 A1   Mar. 21, 2002

Related U.S. Application Data

(60) Provisional application No. 60/232,893, filed on Sep. 15, 2000.

(51) Int. Cl.
*H04N 5/93* (2006.01)
(52) U.S. Cl. .......................... 386/52; 386/65; 386/124; 725/145; 725/146; 370/510
(58) Field of Classification Search ................ 725/114, 725/115, 116, 144, 145, 146; 386/52, 55, 386/100, 113, 85, 124, 46, 65; 370/498, 370/510
See application file for complete search history.

(56) References Cited

U.S. PATENT DOCUMENTS

| | | | |
|---|---|---|---|
| 5,467,342 A | 11/1995 | Logston et al. ............... 370/17 |
| 5,559,999 A | 9/1996 | Maturi et al. ............... 395/550 |
| 5,661,728 A | 8/1997 | Finotello et al. ............ 370/503 |
| 5,845,043 A | 12/1998 | Yanagihara ................. 386/109 |
| 6,414,960 B1* | 7/2002 | Kuhn et al. ............ 370/395.65 |
| 6,430,354 B1* | 8/2002 | Watanabe ................... 709/247 |
| 6,594,439 B2* | 7/2003 | Imahashi et al. ............. 386/52 |
| 6,744,789 B1* | 6/2004 | Michener .................... 370/509 |
| 6,771,644 B1* | 8/2004 | Brassil et al. ............... 370/529 |
| 6,857,129 B2* | 2/2005 | Rogson et al. .............. 725/133 |
| 2002/0056100 A1* | 5/2002 | Shimomura et al. .......... 725/39 |
| 2003/0115612 A1* | 6/2003 | Mao et al. ................... 725/151 |
| 2003/0131076 A1* | 7/2003 | Nelson et al. .............. 709/219 |
| 2004/0133910 A1* | 7/2004 | Gordon et al. ................ 725/37 |
| 2005/0076379 A1* | 4/2005 | White et al. ................ 725/102 |

\* cited by examiner

*Primary Examiner*—Vincent Boccio
(74) *Attorney, Agent, or Firm*—Sandra M. Parker, Esq.

(57) ABSTRACT

A method, apparatus and article of manufacture is provided for processing a previously encoded MPEG video high-resolution (HR) file and corresponding proxy file, for frame accurate timecode repair and synchronization of individual video frames of the HR and proxy files. Each video frame header of the HR and proxy files is modified by a compressed timecode packet having an identifying signature, an absolute timecode of the frame, and a relative timecode of the frame. The timecodes have the SMPTE timecode format HH:MM:SS:FF. The method automatically verifies the timecodes in the HR and proxy files timecode packets. If a repair of the HR file anomalous absolute timecodes is needed, the method automatically corrects the anomalous absolute timecodes in the HR file. If the proxy file starting video frame is offset from the HR file starting video frame, the method automatically synchronizes the proxy and the HR files absolute and relative timecodes.

54 Claims, 19 Drawing Sheets

TIMECODE PACKET

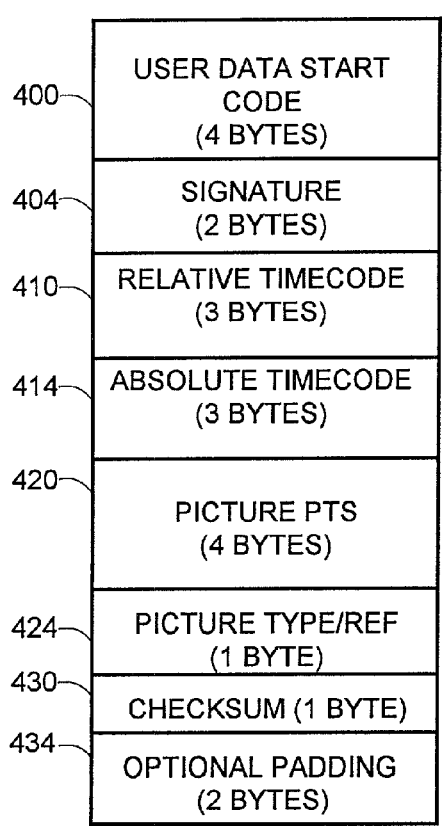

| OFFSET | FORMAT | VALUE |
|---|---|---|
| 0 | 0000 0000 | 0X00 |
| 1 | 0000 0000 | 0X00 |
| 2 | 0000 0001 | 0X01 |
| 3 | 1011 0010 | 0XB2 |
| 4 | 1010 1010 | 0XAA |
| 5 | 1010 1GGP | 0XA8 |
| 6 | BHHH HHMM | |
| 7 | MMMM SSSS | |
| 8 | SSXF FFFF | |
| 9 | NHHH HHMM | |
| 10 | MMMM SSSS | |
| 11 | XSSF FFFF | |
| 12 | PPPP PPPP | |
| 13 | PPPP XPPP | |
| 14 | PPPP PPPP | |
| 15 | PPPP PPPP | |
| 16 | PTTR RRRR | |
| 17 | CCCC CCCC | |
| 18 | 1111 1111 | |
| 19 | 1111 1111 | |

LEGEND

X = MARKERS         P = PTS
H = HOURS           T = PICTURE TYPE
M = MINUTES         R = PICTURE REFERENCE
S = SECONDS         C = CHECKSUM
F = FRAMES          B = THUMBNAIL TAKEN FLAG
G = RIGHTS FLAGS    N = NO MATCHING HI-RES FLAG

RIGHTS FLAGS

00 = FULL RIGHTS
01 = LIMITED RIGHTS
10 = NO RIGHTS
11 = RIGHTS EXPIRED

FIG. 4

INTRODUCTORY TIMECODE PACKET

| | OFFSET | FORMAT | VALUE |
|---|---|---|---|
| 500 — USER DATA START CODE (4 BYTES) | 0 | 0000 0000 | 0X00 |
| | 1 | 0000 0000 | 0X00 |
| | 2 | 0000 0001 | 0X01 |
| | 3 | 1011 0010 | 0XB2 |
| 505 — SIGNATURE (2 BYTES) | 4 | 1011 1011 | 0XBB |
| | 5 | 1011 1GGP | 0XB8 |
| 510 — RELATIVE TIMECODE (3 BYTES) | 6 | BHHH HHMM | |
| | 7 | MMMM SSSS | |
| | 8 | SSXF FFFF | |
| 515 — ABSOLUTE TIMECODE (3 BYTES) | 9 | NHHH HHMM | |
| | 10 | MMMM SSSS | |
| | 11 | XSSF FFFF | |
| 520 — PICTURE PTS (4 BYTES) | 12 | PPPP PPPP | |
| | 13 | PPPP XPPP | |
| | 14 | PPPP PPPP | |
| | 15 | PPPP PPPP | |
| 525 — PICTURE TYPE/REF (1 BYTE) | 16 | PTTR RRRR | |
| 530 — CHECKSUM (1 BYTE) | 17 | CCCC CCCC | |
| 535 — OPTIONAL PADDING (2 BYTES) | 18 | UVYY XXZZ | |
| | 19 | ZZZZ ZZZZ | |

LEGEND

| | |
|---|---|
| X = MARKERS | P = PTS |
| H = HOURS | T = PICTURE TYPE |
| M = MINUTES | R = PICTURE REFERENCE |
| S = SECONDS | C = CHECKSUM |
| F = FRAMES | B = THUMBNAIL TAKEN FLAG |
| G = RIGHTS FLAGS | N = NO MATCHING HI-RES FLAG |
| Y = TIMECODE FLAGS | U = TRUNCATED PROXY START FLAG |
| Z = PROXY OFFSET | V = TRUNCATED PROXY END FLAG |

| RIGHTS FLAGS | TIMECODE TYPE |
|---|---|
| 00 = FULL RIGHTS | 00 = ORIGINAL SOURCE TC |
| 01 = LIMITED RIGHTS | 01 = REPAIRED TC |
| 10 = NO RIGHTS | 10 = HOUSE TC |
| 11 = RIGHTS EXPIRED | 11 = ELAPSED TC |

FIG. 5

|  |  |  | PROXY RELATIVE TC (AFTER REPAIR) |  | PROXY RELATIVE TC (BEFORE REPAIR) |
|---|---|---|---|---|---|
| | HIGH-RES RELATIVE TC | ABSOLUTE TC | | 605 | |
| | | 09:15:10:06 | * | FRAME 1 | 00:00:00:00 |
| | 620— | 09:15:10:07 | * | FRAME 2 | 00:00:00:01 |
| 600 | 625 | 09:15:10:08  615 | * | FRAME 3 | 00:00:00:02  610 |
| | | 09:15:10:09 | * | FRAME 4 | 00:00:00:03 |
| FRAME 1 | 00:00:00:00 | 09:15:10:10 ** | 00:00:00:00 | FRAME 5 | 00:00:00:04 |
| FRAME 2 | 00:00:00:01 | 09:15:10:11 | 00:00:00:01 | FRAME 6 | 00:00:00:05 |
| FRAME 3 | 00:00:00:02 | 09:15:10:12 | 00:00:00:02 | FRAME 7 | 00:00:00:06 |
| FRAME 4 | 00:00:00:03 | 09:15:10:13 | 00:00:00:03 | FRAME 8 | 00:00:00:07 |
| ⋮ | ⋮ | ⋮ | ⋮ | ⋮ | ⋮ |
| FRAME N-4 | 00:15:35:18 | 09:30:45:27 | 00:15:35:18 | FRAME N-6 | 00:15:35:22 |
| FRAME N-3 | 00:15:35:19 | 09:30:45:27 | 00:15:35:19 | FRAME N-5 | 00:15:35:23 |
| FRAME N-2 | 00:15:35:20 | 09:30:45:28 | 00:15:35:20 | FRAME N-4 | 00:15:35:24 |
| FRAME N-1 | 00:15:35:21 | 09:30:45:29 | 00:15:35:21 | FRAME N-3 | 00:15:35:25 |
| FRAME N | 00:15:35:22 | 09:30:46:00 | 00:15:35:22 | FRAME N-2 | 00:15:35:26 |
| | | 09:30:46:01 | * | FRAME N-1 | 00:15:35:27 |
| HIGH-RES FILE | | 09:30:46:02 | * | FRAME N | 00:15:35:28 |
| | | | | PROXY FILE | |

\* FRAME MARKED AS 'NO HI-RES MATCH' IN TIMECODE PACKET AND NEVER RENDERED BY THE MPEG PLAYER

\*\* PROXY TIMECODE OFFSET = +00:00:00:04

FIG. 6

|  | HIGH-RES RELATIVE TC | ABSOLUTE TC | PROXY RELATIVE TC (AFTER REPAIR) |  | PROXY RELATIVE TC (BEFORE REPAIR) |
|---|---|---|---|---|---|
| 700 → | | | 715 * | 705 | |
| FRAME 1 | 00:00:00:00 | 09:15:10:06 | | | |
| FRAME 2 | 00:00:00:01 | 09:15:10:07 | | | |
| FRAME 3 | 00:00:00:02 | 09:15:10:08 | | | |
| FRAME 4 | 00:00:00:03 | 09:15:10:09 | | | |
| FRAME 5 | 00:00:00:04 | 09:15:10:10 *** | 00:00:00:04 | FRAME 1 | 00:00:00:00 |
| FRAME 6 | 00:00:00:05 | 09:15:10:11 | 00:00:00:05 | FRAME 2 | 00:00:00:01 |
| FRAME 7 | 00:00:00:06 | 09:15:10:12 | 00:00:00:06 | FRAME 3 | 00:00:00:02  710 |
| FRAME 8 | 00:00:00:07 | 09:15:10:13 | 00:00:00:07 | FRAME 4 | 00:00:00:03 |
| ... | ... | ... | ... | ... | ... |
| FRAME N-6 | 00:15:35:22 | 09:30:45:27 | 00:15:35:22 | FRAME N-4 | 00:15:35:18 |
| FRAME N-5 | 00:15:35:23 | 09:30:45:27 | 00:15:35:23 | FRAME N-3 | 00:15:35:19 |
| FRAME N-4 | 00:15:35:24 | 09:30:45:28 | 00:15:35:24 | FRAME N-2 | 00:15:35:20 |
| FRAME N-3 | 00:15:35:25 | 09:30:45:29 | 00:15:35:25 | FRAME N-1 | 00:15:35:21 |
| FRAME N-2 | 00:15:35:26 | 09:30:46:00 | 00:15:35:26 | FRAME N | 00:15:35:22 |
| FRAME N-1 | 00:15:35:27 | 09:30:46:01 | ** | PROXY FILE | |
| FRAME N | 00:15:35:28 | 09:30:46:02 | | | |
| HIGH-RES FILE | 725 | 720 | | | |

\* 'TRUNCATED PROXY START' FLAG SET IN TIMECODE PACKET TO ALERT USER THAT NOT ALL FRAMES IN THE HIGH-RESOLUTION FILE CAN BE BROWSED

\*\* 'TRUNCATED PROXY END' FLAG SET IN TIMECODE PACKET

\*\*\* PROXY TIMECODE OFFSET = -00:00:00:04

FIG. 7

SYSTEM AND METHOD OF TIMECODE REPAIR AND SYNCHRONIZATION IN MPEG STREAMS

RELATED APPLICATIONS

The present invention is related to a provisional patent application entitled "Apparatus and Methods For Processing MPEG Streams" by the same inventor, Ser. No. 60/232,893, filed on Sep. 15, 2000, and co-pending applications entitled: "System and Method of Processing MPEG Streams For File Index Insertion" Ser. No. 09/860,700, filed on May 18, 2001, "System and Method of Processing MPEG Streams For Storyboard and Rights Metadata Insertion", Ser. No. 09/850,522, filed concurrently, and "System and Method of Processing MPEG Streams For Time code Packet Insertion" Ser. No. 09/850,201, filed concurrently, all assigned to the assignee of the present invention and fully incorporated herein by reference.

BACKGROUND OF THE INVENTION

1. Field of the Invention

The present invention relates generally to the compression, cataloging and viewing of full motion videos and, more particularly, to the processing of compressed video data.

2. Description of Related Art

The infrastructure and process required to create and operate a video archive in the digital domain are well known in the broadcast video industry. The archiving process generally begins by digitizing and compressing the analog video using MPEG-1 or MPEG-2 compression, then moving the compressed video file to a long term storage. To preserve the contribution quality of the video, broadcasters generally select a high compressed bitrate (i.e., 15–40 Mbps), which allows the original video to be recovered with relatively high fidelity in spite of the lossiness of the MPEG compression scheme.

The high bitrate of the compressed video, however, presents considerable problems to the broadcaster's local area network and computer workstation infrastructure, when the video must be distributed for viewing and post-production work. The high network bandwidth and the amount of time required to transfer the assets throughout the plant places an upper limit on the number of concurrent transfers and severely constrains productivity. In response to this bandwidth problem, broadcasters create an additional copy of the video at a much lower compressed bitrate (i.e., 1.5–4 Mbps). This low bitrate file, referred to as a 'proxy' or 'browse' file, enables users to quickly download the video or to view it directly on computer monitors by utilizing a streaming video server. To facilitate the viewing of video assets outside the local area network, a second proxy file is often encoded at a very low bitrate (56–1000 Kbps), for streaming over low speed terrestrial lines.

After ingestion of the video, the next step in the archiving process is to create an entry for the video in the video library catalog. This entry contains metadata, which is information pertinent to the video. The contents and format of a video catalog record, normally broadcaster unique, facilitate the search and retrieval of video clips within the broadcaster's video library. Presently, there are commercially available video catalog applications (catalogers) that will automatically extract from an MPEG-1 or MPEG-2 video file metadata, such as closed caption text and the text of the actual audio program, obtained via speech recognition technology. Catalogers further extract metadata from the video by performing scene change analysis and creating a bitmap of the first frame after each cut or major scene transition. These bitmaps, referred to individually as a 'thumbnail' or collectively as a storyboard, are considered essential metadata because they enable the end user to determine very quickly the video content. Absent the storyboard, the end user is forced to view the video or, at a minimum, fast forward through a video to find the desired video segment. An additional feature of prior art catalogers is the capability to randomly access and play the proxy video file by double clicking on a storyboard thumbnail.

Further productivity gains can be achieved if the proxy file is a replica of the high-resolution video, where both files begin on the same video frame and have equal duration. When the browse file is a true proxy, a video production engineer is able to import several proxy files into a video editor and produce a program, creating an edit decision list (EDL). This EDL is subsequently exported to a high quality video editing suite that downloads the high-resolution version of the videos from the archive and executes the EDL to produce the air-ready material. Ideally, the broadcast editing suite retrieves from the broadcast server or archive only those segments of the high-resolution file that are specified in the EDL.

There are two timecodes associated with every video: an absolute and relative timecode. The absolute timecode is the SMPTE timecode recorded as the video is being shot. It usually reflects the actual time of day, but if the camera operator fails to properly set the SMPTE timecode generator on the camera, it may indicate any random clock time. Reporters and producers taking notes will record the SMPTE timecode while filming to enable them to quickly find important footage during post-production. It is for this reason that many archive librarians insist on preserving the absolute timecode as essential metadata when compressing and cataloging video.

The relative timecode is a timecode that is relative to the start of the video, and is often referred to as elapsed time. Many producers prefer to use relative timecode instead of absolute timecode during editing sessions, because it can simplify the arithmetic associated with calculating video clip duration. More importantly, it is more dependable than the absolute timecode.

The absolute timecode on a source video tape can be anomalous (e.g., missing, discontinuous, jump backwards in time, non-incrementing, non-drop frame mode, etc.). If a dub of the material is used as video source, it may not reflect the original timecode of acquisition. Moreover, regardless of whether longitudinal timecode (LTC) or vertical interval timecode (VITC) is being read as the source of timecode, tape dropout and other media defects can also result in corrupted SMPTE timecodes.

Accordingly, it would be advantageous to automatically verify and correct a bad timecode, when ingesting assets for permanent archival. It would be further advantageous for archive librarians to be able to re-stripe or change the timecode of the material, to suite their operational requirements. It would be yet further advantageous to be able to update the timecodes attached to each thumbnail in the storyboard, and any timecodes referenced in any existing description of the video and audio program, whenever the SMPTE timecodes in the high-resolution file have been modified.

However, in some instances, librarians may insist on preserving the original source timecode when archiving video. When video is later used to create new program material, the original source timecode facilitates the tracing of the content genealogy to the original source material. However, when the original source timecodes are maintained, the timecodes may contain gaps where shooting was halted and restarted. In the case of a compilation video, the video actually comprises a series of separate video clips.

In case of the noncontinuous absolute timecodes, EDL must be generated using relative timecode. It is for this reason that the relative timecodes of the proxy file must match the relative timecodes of the high-resolution file. This requirement in turn necessitates a method of synchronizing the relative timecodes of the proxy and high-resolution files.

Producing a high-resolution video and one or more proxy files with frame accurate synchronized relative timecodes of the proxy and high-resolution files is problematic, because two or more MPEG encoders and the source playout device must be started frame accurately, and the encoders must be capable of extracting SMPTE timecode (VITC) from the vertical blanking interval and storing the timecode in the MPEG Group of Pictures (GOP) header. (Some broadcasters may allow the encoders to encode alternately the locally produced house SMPTE timecode, instead.) Moreover, the encoders must not drop or repeat any frames during the encoding process, and the encoders must stop on the same video frame.

Although there are commercially available MPEG encoders that are capable of producing such proxy files, these encoders are prohibitively expensive and are not economical for an archive librarian planning to operate many ingest stations. Moreover, these high-end encoders often store the MPEG data in a vendor proprietary elementary stream format, which makes them uninteroperable with other MPEG decoders. Therefore, video files sent to another broadcast facility must be first remultiplexed into a MPEG compliant format. It is also undesirable from a business perspective to use a nonstandard storage format. Video quality and reliability are the normal criteria for selecting an encoder vendor. However, there is also a need to create proxy files using good-quality, but less capable MPEG encoders. An encoder that fails to store proper SMPTE time in the GOP header, for example, should not be eliminated from consideration, if it meets all other broadcaster requirements.

For all but a few high-end MPEG encoders, it is exceedingly difficult for an ingest application to consistently start multiple encoders and video sources with frame accurate timecodes. This can be attributed to the following factors: the inherent latency of MPEG encoders configured to encode at different rates and GOP configurations; operating systems, such as UNIX, AIX, and Windows NT, are not real-time operating systems with low interrupt service latency, consistent thread dispatch and a strict priority enforcement, packet delay when controlling encoders over a TCP/IP network; and inconsistent performance of audio/video equipment.

To facilitate the composition of EDL for the production of video programming, it is imperative that both the proxy and high-resolution video files be frame-accurately timestamped. Having to later re-encode proxy files to correct frame inaccuracies significantly increases the cost of operating of video archive. There is a demonstrable need to be able to adjust the timecodes of proxy files, when the starting frame of a proxy MPEG file is offset from the starting frame of its associated high-resolution MPEG file.

Presently, there are also problems with Storyboard Timecodes and EDL Composition. Conventional video catalogers capture either the elapsed time or the absolute timecode when creating thumbnails. This is problematic if the video source has anomalous timecodes, because the thumbnail timecode cannot be utilized for either EDL composition or play from offset commands. Storing both relative and absolute timecodes with each thumbnail would provide advantage over prior art. If discontinuous absolute timecodes were encountered, relative timecodes would be used instead, to create EDL and cue the MPEG player. Further advantage would be gained from modifying the EDL builder application to compose EDL statements using either relative or absolute timecode. Automatic switching to relative timecodes would allow librarians to maintain and view the original source timecodes, while generating a frame-accurate EDL.

Therefore, a need exists for the post-encoding modification of MPEG file timecodes, to create frame accurate timecodes. It is desirable to be able to adjust the timecodes of proxy files, when the starting frame of a proxy MPEG file is offset from the starting frame of its associated high-resolution MPEG file, to synchronize relative timecodes of the proxy and high-resolution files. It would be further advantageous to automatically verify and correct bad timecode when ingesting assets for permanent archival, and to be able to re-stripe or change the timecode of the material, to suite the operational requirements. It would be further advantageous to be able to update the timecodes attached to each thumbnail in the storyboard, and any timecodes referenced in any existing description of the video and audio program, whenever the SMPTE timecodes in the high-resolution file have been modified.

SUMMARY OF THE INVENTION

The foregoing and other objects, features, and advantages of the present invention will be apparent from the following detailed description of the preferred embodiments which makes reference to several drawing figures.

One preferred embodiment of the present invention is a method of processing a previously encoded MPEG video high-resolution (HR) file and corresponding proxy file, for frame accurate timecode repair and synchronization of individual video frames of the HR file and proxy file. The method has the following steps:

(a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;

(b) modifying the HR file and proxy file by inserting in a header of each video frame of the HR file and proxy file the corresponding compressed timecode packet, while maintaining the files' original frame presentation timing;

(c) automatically verifying the timecodes in the HR file and proxy file timecode packets;

(d) if needing a repair of the HR file anomalous absolute timecodes, automatically correcting the anomalous absolute timecodes in the HR file timecode packets; and (e) if the proxy file starting video frame being offset from the HR file starting video frame, automatically synchronizing the proxy file and the HR file absolute timecodes and relative timecodes in the timecode packets, thereby preserving the MPEG compliance and compressed audio/video data of the HR file and proxy file.

The timecode packet is automatically inserted in a user data packet of the video frame, between a picture start header and a first slice header. The step of inserting the timecode packet preferably includes a step of periodically removing the MPEG video file unused data bytes, equal in number with the inserted timecode packet bytes, for preserving the MPEG video file original size and multiplex bitrate. Alternatively, the step of inserting the timecode packet includes a step of increasing the MPEG video file original multiplex bitrate, to compensate for additional timecode packet bytes inserted into the MPEG video file. Step (d) further has a step for updating the absolute timecodes in the proxy file timecode packets, and a step for updating absolute timecodes and relative timecodes of each storyboard thumbnail, for enabling frame-accurate composition of an edit decision list (EDL).

Step (e) preferably has a step for aligning the HR file video frames and proxy file video frames using absolute timecodes, and a step for updating the relative timecodes in the proxy file timecode packets with the relative timecodes of the HR file. In the aligning step of step (e), if the proxy file has accurate absolute timecodes, aligning of the absolute timecodes of the HR file and proxy file is performed. If the absolute timecodes are not accurate, the step uses closed captioning for aligning the proxy file and HR file, and copying the absolute timecodes from the HR file into the proxy file timecode packets. If the HR file and proxy file are not being closed captioned, the closed captioning step further has a step, at the start of the aligning step, for inserting into a predetermined number of video frames of the HR file and proxy file a closed caption data stream for locating and aligning an identical video frame in the HR file and proxy file, and, after the file aligning step, a step for removing the inserted closed caption data stream from the HR file and proxy file.

Another preferred embodiment of the present invention is an apparatus implementing the abovementioned method embodiment of the present invention.

Yet another preferred embodiment of the present invention is a program storage device readable by a computer tangibly embodying a program of instructions executable by the computer to perform method steps of the above-mentioned method embodiment of the present invention.

BRIEF DESCRIPTION OF THE DRAWINGS

Referring now to the drawings in which like reference numbers represent corresponding parts throughout:

FIG. 4 illustrates a data structure of a compressed MPEG user data packet containing encoded timecode and frame information, according to the preferred embodiments of the present invention;

FIG. 5 illustrates a data structure of a compressed MPEG user data packet containing encoded introductory timecode and framing information structure, used to mark the first frame of a proxy file, according to the preferred embodiments of the present invention;

FIG. 6 illustrates the synchronization of the relative timecodes of a high-resolution video file and its associated proxy file when the proxy file is of longer duration, according to the preferred embodiments of the present invention;

FIG. 7 illustrates the synchronization of the relative timecodes of a high-resolution video file and its associated proxy file when the proxy file is of shorter duration, according to the preferred embodiments of the present invention;

DETAILED DESCRIPTION OF THE PREFERRED EMBODIMENTS

Figure 1:
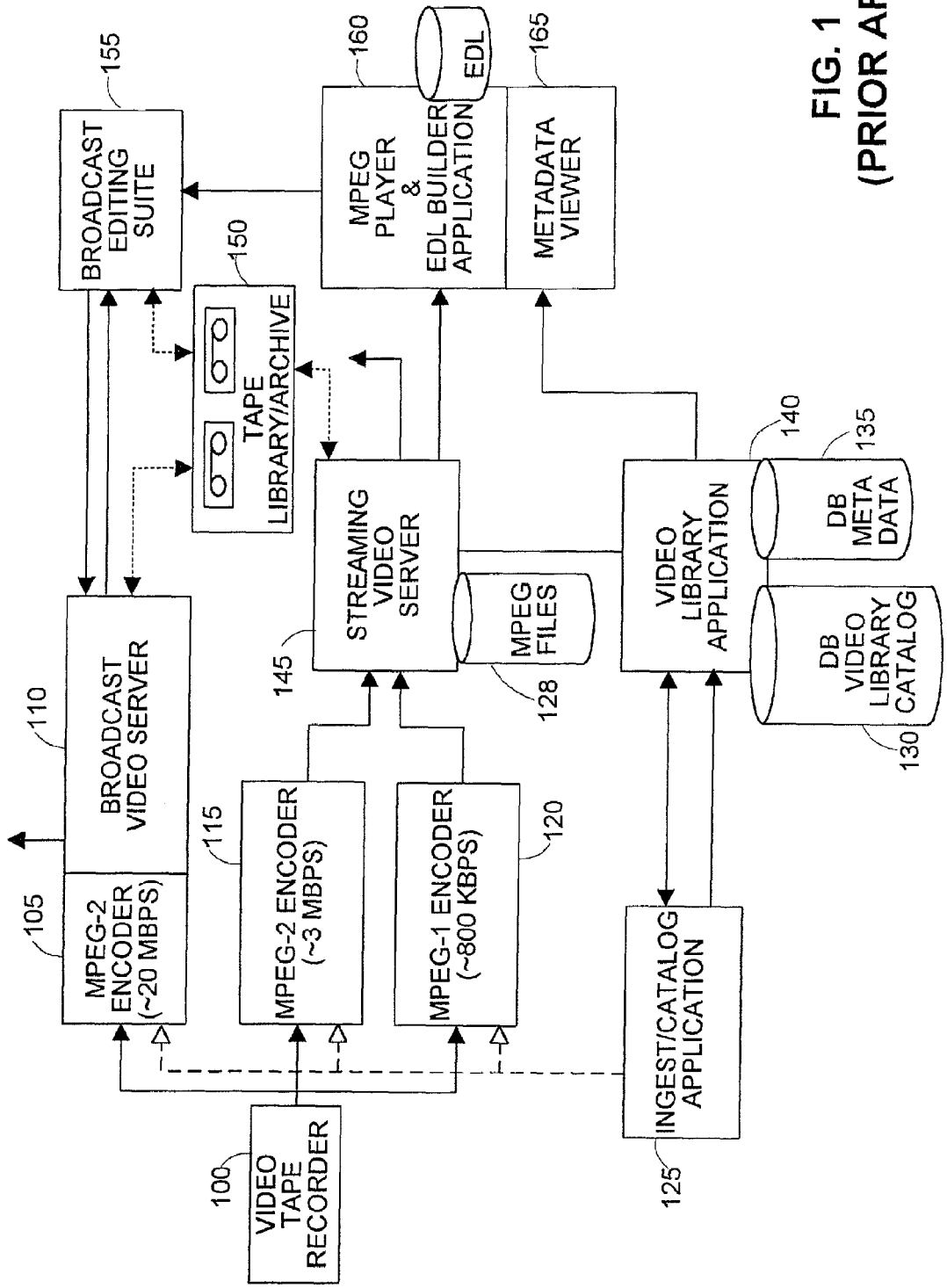
FIG. 1 is an illustration of a conventional video ingest/cataloging system, according to a prior art.

In the following description of the preferred embodiments reference is made to the accompanying drawings which form the part thereof, and in which are shown by way of illustration of specific embodiments in which the invention may be practiced. It is to be understood that other embodiments may be utilized and structural and functional changes may be made without departing from the scope of the present invention.

The present invention is directed to a method and system for processing an MPEG-1 or MPEG-2 video file, to modify the absolute SMPTE timecodes to fix incorrect or anomalous timecodes. The method and system can further detect inaccurate timecodes in a proxy file and adjust, forward or backward, the relative SMPTE timecodes of the proxy file, when the proxy file is not a replica of its associated high-resolution video file, to enable frame-accurate composition of EDL, and to synchronize the proxy file frames with the corresponding video frames of the high-resolution video file. Furthermore, the present invention stores timecode synchronization metadata in the first frame of the proxy file, to signal a disparity in the durations of the proxy and high-resolution video files. It may also mark frames of the proxy file as unviewable, when there is no corresponding frame in its associated high-resolution video file.

Since the generated timecode synchronization metadata flags must be stored on a frame basis, the present invention relies heavily on the technique for inserting timecode packets taught in the co-pending application entitled "System and Method of Processing MPEG Streams For Timecode Packet Insertion", which inserts timecode packets as user data after the picture header of each frame. Subsequent to the insertion of the timecode packets into the MPEG file and storing of the apposite video metadata into the catalog record, the present invention reprocesses the MPEG video file storing the timecode metadata information in unused fields of the timecode packets.

The preferred embodiments of the present invention also stores information in the first video frame, in order to indicate the source of the video timecode and any timecode repair action taken. It also stores both relative and absolute timecodes with each thumbnail in a storyboard. It further allows the EDL builder application to automatically detect anomalous timecodes in the storyboard and proxy file, and to use relative timecodes instead, when generating EDL statements.

In order to track the timecode origin and the disparity in video lengths of the proxy and high-resolution files, the following synchronization metadata flags and fields may be defined by the present invention in miscellaneous fields of a timecode data packet of the proxy file: no high-resolution frame match, proxy file start truncated, proxy file end truncated, timecode offset between proxy and high-resolution files expressed as a frame count, and a source of absolute timecode field. These fields create a set of timecode synchronization metadata which are static, that become a permanent part of the proxy file retained for the duration of video playout.

In the preferred embodiments of the present invention, the timecode repair and synchronization application (TRSA) software is automatically invoked upon completion of ingest encoding. After the timecode packets have been inserted into the proxy files, the absolute timecodes of the high-resolution (HR) video files are examined and corrected, if the timecode repair feature has been enabled. If the HR timecodes require modification, the absolute timecodes in the proxy files and storyboard are likewise updated.

If the automatic synchronization of the HR video files and proxy files feature is enabled, the TRSA proceeds to synchronize the relative timecodes, using either absolute timecode (if the proxy MPEG encoders are frame-accurate) or closed caption data, to precisely align the frames of the HR video files and proxy files. When closed captioning is needed for synchronization and the source material has not been closed captioned, the ingest application injects a short closed caption data stream at the start of encoding. After the files have been synchronized, the injected closed caption characters are removed from the video files.

In an alternate preferred embodiment of the present invention, the timecode synchronization of the HR video files and proxy file is performed manually, utilizing a graphical user interface (GUI) of an MPEG player that permits a librarian to simultaneously view the HR and proxy files. Using the VTR controls of the MPEG player, the librarian locates an identical frame in both the proxy and HR player, and clicks a GUI button to command the TRSA application to synchronize the relative timecodes of the two files.

FIG. 1 is an illustration of a conventional video ingest/cataloging system, according to a prior art. In FIG. 1, a video tape recorder 100 provides a source video for encoding. An ingest/catalog application 125 controls, in parallel, three MPEG encoders 105, 115, 120, which produce a high-resolution video file and two proxies. The high resolution MPEG encoder 105 is integrated with a broadcast video server 110. As the ingest/catalog application 125 creates MPEG files 128 and associated metadata 135, catalog records in a video library catalog 130 are created or updated using a video library application 140. The cataloging and indexing of the video files enables subsequent search and retrieval.

Upon completion of encoding, the compressed files are moved onto a streaming video server 145 which is capable of file FTP or isochronous streaming to MPEG decoders/players 160. All video content is copied to a tape library/archive 150 for long term storage, and retrieved as necessary. Catalog records are individually examined using a cataloger/metadata viewer 165. The full video file or any part thereof may be viewed via the MPEG player 160. The system also incorporates a broadcast editing suite 155.

Figure 2:
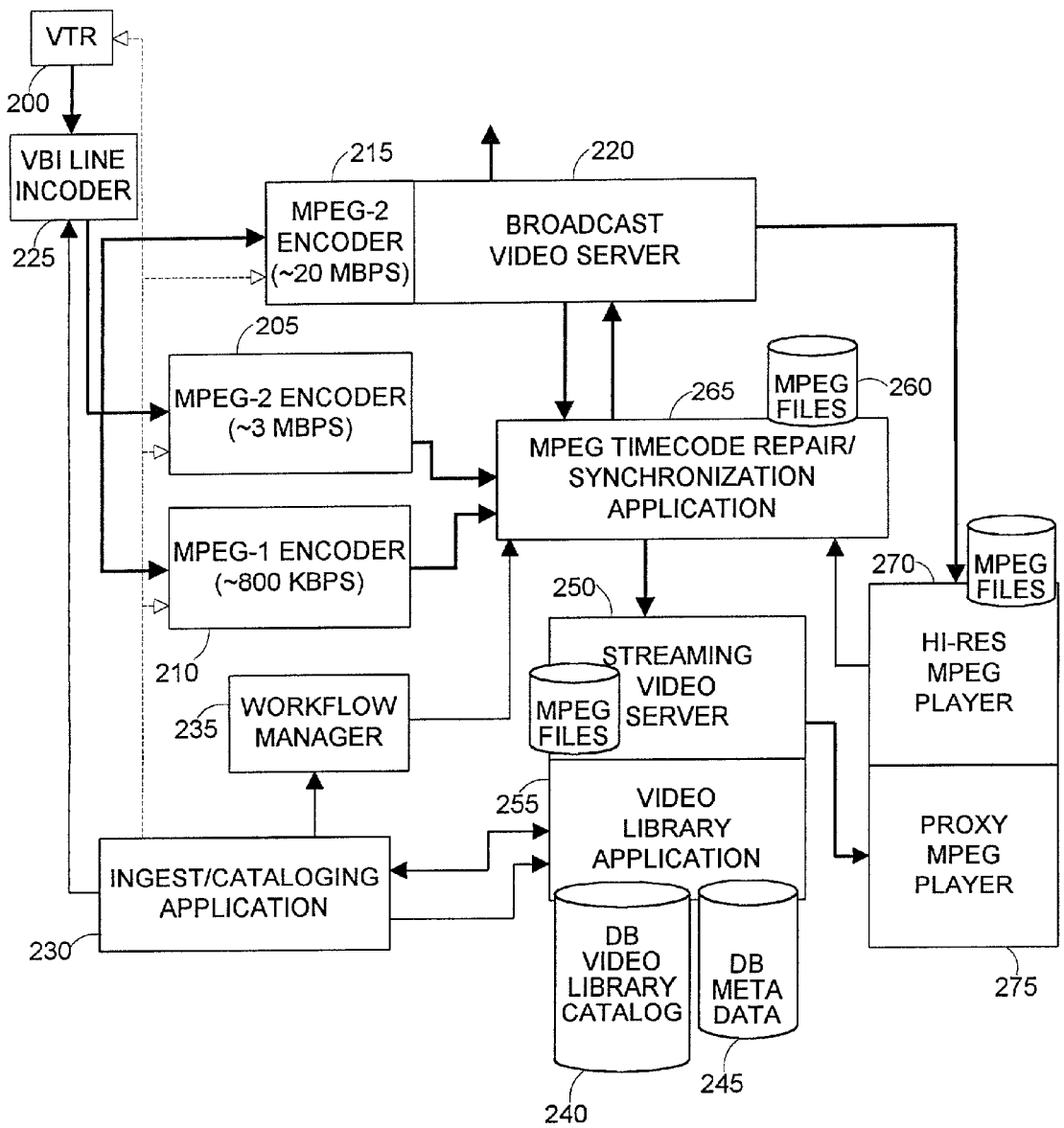
FIG. 2 depicts the placement of the timecode repair/synchronization application, executing within the video cataloging system, according to the preferred embodiments of the present invention.

FIG. 2 illustrates the system preferred embodiment of the present invention, where an ingest/cataloging application 230 receives a catalog record from a video library catalog file 240, and updates the metadata in a metadata file 245 of a video library application 255. The invocation of a timecode repair/synchronization application (TRSA) 265 is automatically triggered by a workflow manager 235, upon receiving notification from the ingest/cataloging application 230 that encoding has been completed. In FIG. 2, there is a video tape recorder 200, a video line encoder 225, and an MPEG-2 encoder 215. Proxy files produced by two low resolution encoders, MPEG-2 encoder 205, and MPEG-1 encoder 210, and are stored on a hard drive 260 of a separate server having the TRSA 265, to be processed by the TRSA. As an ingest/cataloging application 230 signals job completions to the workflow manager 235, the workflow manager 235 invokes the TRSA 265 to optionally repair and/or synchronize the timecodes of the HR video file and proxy file, and then copy the modified file to a streaming video server 250. The repair/synchronization process necessitates the retrieval of the HR file from a broadcast video server 220, for playout to air. The system of FIG. 2 may also include a high-resolution MPEG player 270, and a proxy MPEG player 275.

To automate the synchronization of timecodes when using non frame-accurate proxy encoders, the present invention injects a stream of numeric characters into the video stream as closed caption data, which are encoded by the VBI line encoder 225. Once the TRSA 265 has confirmed that all encoders have begun file encoding, the closed captioning is halted.

Figure 3:
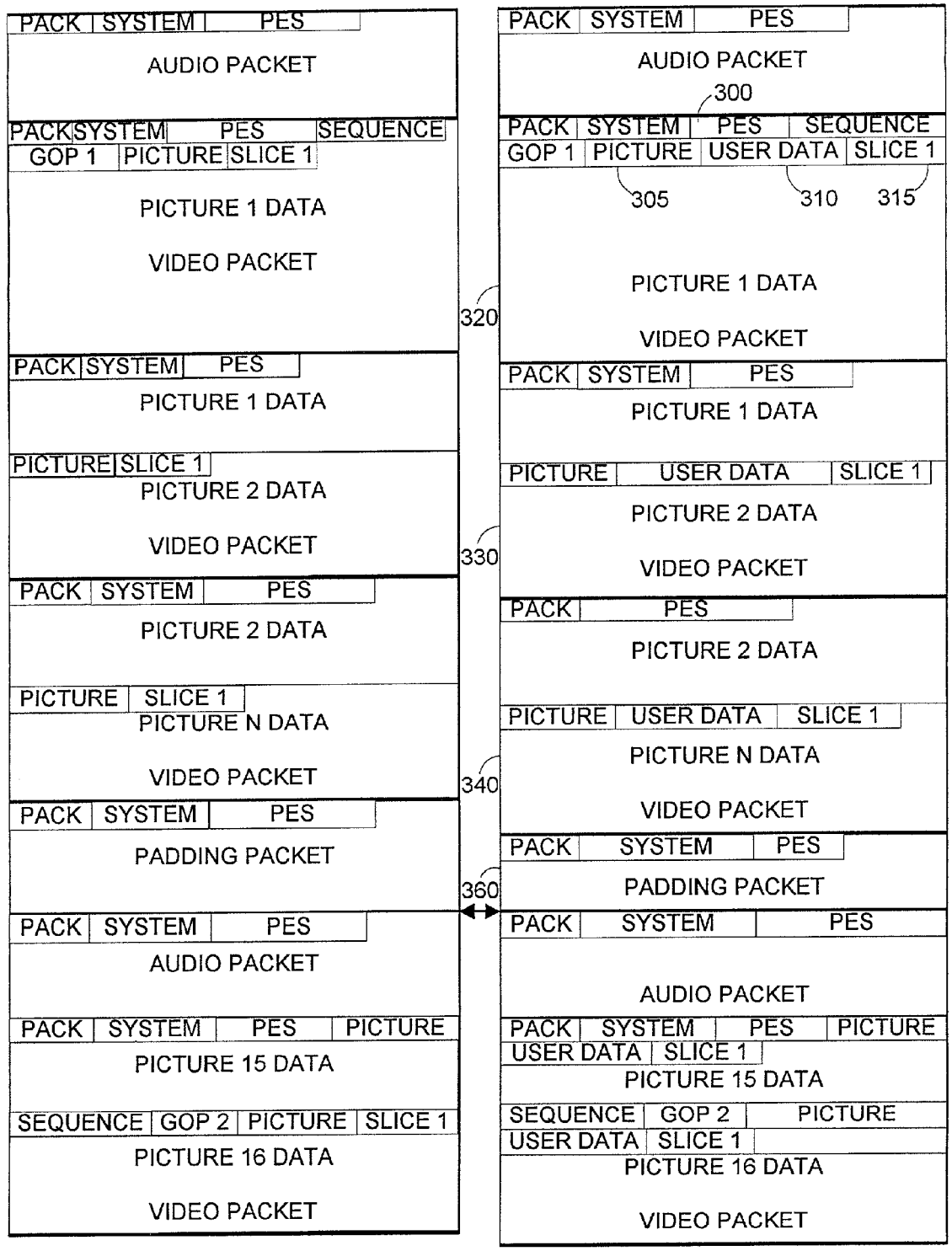
FIG. 3 illustrates the formatting of an MPEG file as originally encoded, and with timecode packets inserted according to the preferred embodiments of the present invention, while maintaining the same bitrate and file length.

FIG. 3 illustrates the formatting of an MPEG file as originally encoded, and with timecode packets inserted according to the preferred embodiments of the present invention, while maintaining the same bitrate and file length. Thus, FIG. 3 provides a high level, non-scaled illustration of the MPEG file format before and after timecode packet insertion, while maintaining the original multiplex bitrate and file size. After a PES 300, an 18-byte timecode packet, formatted as a user data packet 310, is placed between a picture header 305 and a first slice header 315 of each video frame. The timecode packet is inserted into other video packets, such as video packets-2 330 and video packets-3 340. When a first padding packet 360 is encountered, it is reduced in size to balance out the surplus of timecode packet bytes. Thus, the presentation and decoding timestamps do not require recalculation of the video file size.

FIG. 4 illustrates a data structure of a compressed MPEG user data packet containing encoded timecode, frame information and metadata, according to the preferred embodiments of the present invention. In FIG. 4, each timecode packet compressed data structure begins with a standard user data start code 400, followed by a unique 13-bit signature 404 (such as 0xAAA8) that disambiguates the timecode packet user data from other user data packets that may be present. Three markers, denoted in FIG. 4 by 'X', are placed throughout the remaining data bytes to prevent start code emulation. These markers are also checked by the decoding MPEG player as part of the signature verification. A relative timecode 410 and absolute timecode 414 are encoded in the next 6 bytes, followed by a picture PTS 420, and picture type and reference field 424. The high order bit of the absolute timecode field 414 has been usurped to be used as a 'No HR match' (N) flag, to signal the MPEG player that there is no corresponding HR video frame for this proxy frame. An 8-bit checksum 430 enables the decoder to detect packet bit errors. There may also be some optional padding fields 434. FIG. 4 also illustrates a legend and the preferable format and hexadecimal value of each byte of the timecode packet.

The present invention generates other metadata associated with timecode synchronization and identification, that must be permanently stored within the proxy file. This is accomplished by creating a second type of timecode packet, referred to as an introductory timecode packet, that utilizes the last two padding bytes of the standard timecode packet of FIG. 4, and gets inserted into the first video frame of the proxy file. When the packet is decoded by the MPEG player, the timecode metadata are extracted and retained for the duration of video playout. Referring now to FIG. 5, the introductory timecode packet starts with a standard user data start code 500, and contains its own unique signature 505 (0xBBB8), to distinguish it from the standard timecode packet. A relative 510 and absolute 515 timecodes are encoded in the next 6 bytes, followed by a picture PTS 520, and picture reference and type field 525. An 8-bit checksum 530 enables the decoder to detect packet bit errors, FIG. 5 also illustrates a legend and the preferable format and hexadecimal value of each byte of the timecode packet. As can be seen in the legend of FIG. 5, a timecode repair information field 535 contains two flags (U,V) to signal a truncated proxy file start and end flags, a timecode type field (Y), and a proxy offset field (Z), which encodes the starting timecode differential as a frame count. The proxy offset field is 9 bits in length, with a tenth bit that signs the value. The range of +/−511 frames provides the ingest application with a window of 34 seconds for starting the proxy encoder. Lastly, the timecode type identifies the source of the absolute timecode as original source timecode, repaired timecode, elapsed timecode or house timecode.

FIG. 6 illustrates an HR 600 and proxy file 605, where the proxy file 605 has extra frames at the beginning and end that are not present in the HR file 600, so that the proxy file is of longer duration than the HR file. Further shown are relative timecodes of the proxy file: a relative timecode 610 before the timecode synchronization has occurred, and a relative timecode 615 after timecode synchronization has occurred. The proxy relative timecodes 615 have been adjusted to match relative timecodes of the HR file 625. The extraneous leading and trailing proxy frames are each marked with a 'No HR Match' flag, that will cause the MPEG player to suppress rendering so that they are never viewed by the end user.

Similarly, FIG. 7 illustrates the synchronizing of a HR video file 700 and proxy file 705, where the proxy file is of shorter duration than the HR file. To synchronize the proxy file with the HR file, the relative timecodes 710 of the proxy file 705 are adjusted to commence at the same relative timecode 715, 725 of the corresponding HR video frame, and 'truncated' flags are set accordingly. Although the truncated proxy prevents the end user from viewing the extremities of the HR file, in practice, the loss of a few leading and trailing frames is usually of little consequence. However, if the missing proxy frames are considered problematic, the ingest application can be configured to start proxy encoders earlier, to ensure the proxy file is always longer than the HR file.

After synchronization, the TRSA calculates and stores the original difference between the HR and proxy relative timecodes. This proxy timecode offset may be a positive or negative value. Since the absolute timecodes 720 are used to synchronize the relative timecodes, they are synchronized at an earlier stage in the process, but absolute timecode synchronization is only required when the proxy encoder does not provide reliable timecodes.

MPEG File Encoding

Figure 8A:
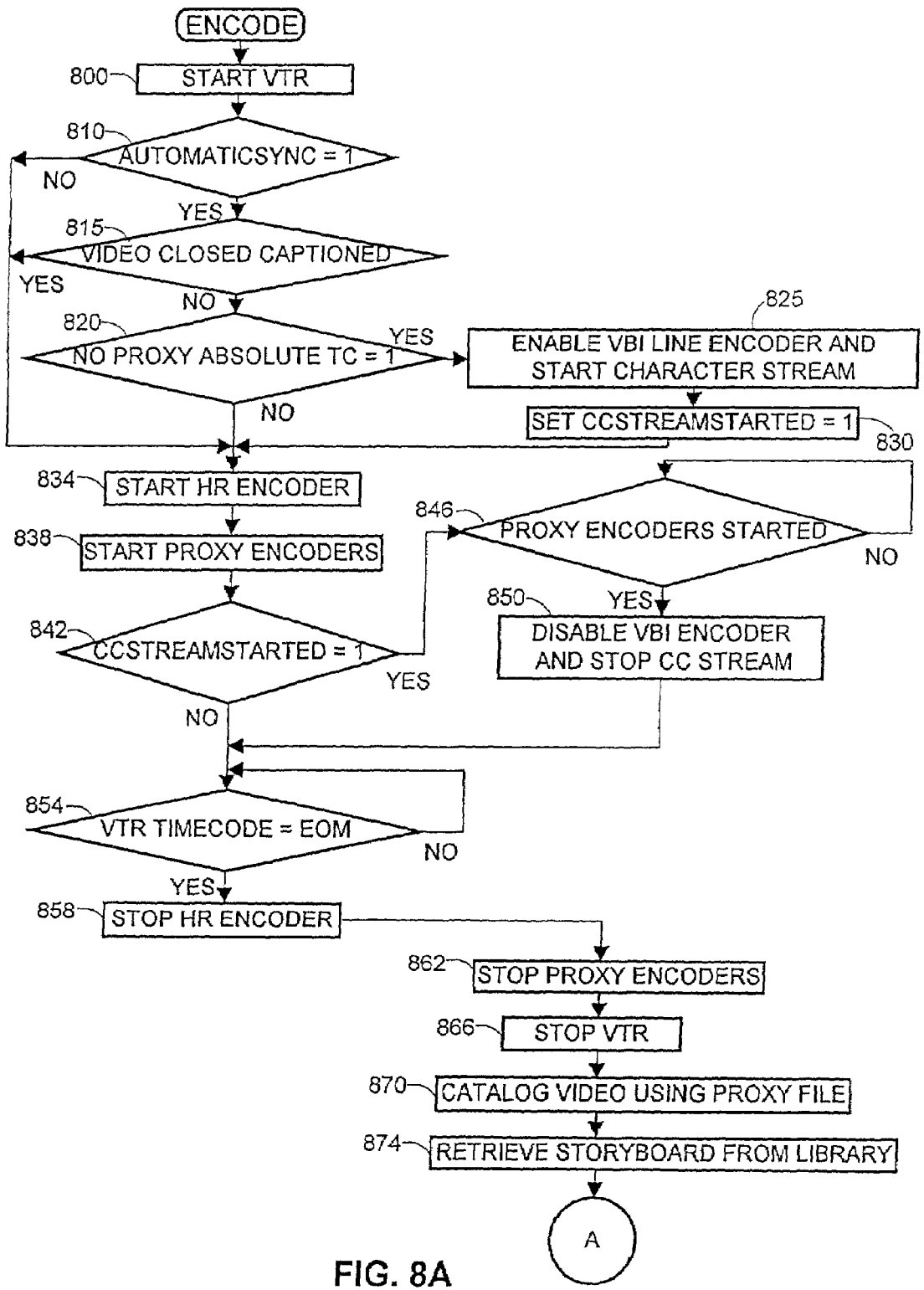
FIGS. 8A and 8B represent a logic flow diagram of the video encoding routine of a video ingest application, according to the preferred embodiments of the present invention.
Figure 8B:
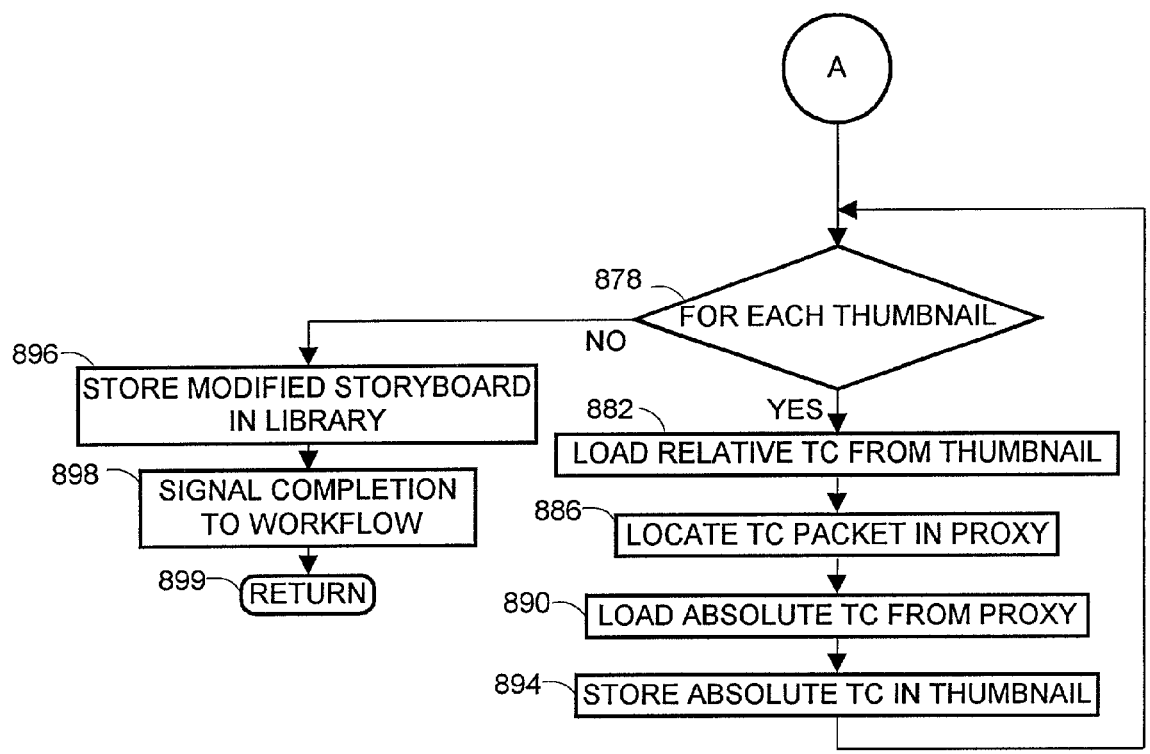

FIGS. 8A and 8B represent a logic flow diagram of the video encoding routine of a video ingest application, that encodes the HR and proxy files according to the preferred embodiments of the present invention. In FIGS. 5A and 5B, the VTR containing the source video material is commanded to start in step 800, and the AutomaticSync input parameter is tested in step 810 for the set condition. Automatic synchronization is the default application behavior, which must be overridden by the AutomaticSync input parameter in order to suppress it.

In order to automate the synchronization process, the TRSA requires either frame-accurate absolute timecodes in the proxy files, or closed captioning in the source material. If the proxy encoder does not provide frame accurate timecodes, and the source material is not closed captioned, then the ingest application must generate its own character stream and enable the VBI line encoders to insert the characters as NTSC line 21, field 1 closed caption data, in a predetermined number of frames at the beginning of the video file. Since line 21 is limited to two characters, the application generates a stream of unique alphanumeric character pairs, such as AA, AB, AC, AD, . . . ending with 97, 98, 99. This pattern generates 1296 unique character pairs, which is sufficient for 43 seconds of closed captioning.

Continuing in FIGS. 8A and 8B, if automatic synchronization is enabled in step 810, it is tested in step 815 whether the input video is not flagged as closed captioned material in the catalog record, and in step 820 whether the proxy encoder does not provide reliable absolute timecode. If the yes condition of step 820 is reached, the ingest application enables the VBI line encoder and starts the closed caption character stream in step 825, and a flag is set in step 830 to signal the start of character generation. If, in step 815, the source video is found to be closed captioned, or the proxy encoder is found in step 820 to provide dependable timecode, the need to insert close caption data is precluded, and the code falls through to step 834 to start the HR encoder, and to step 838 to start proxy encoder.

After commanding the encoders to start, if the CCStreamStarted flag is set in step 842, the code enters a loop in step 846 where the proxy encoders are continuously queried, to verify that encoders have begun streaming MPEG data to be saved on a disk. While a delay of up to 200 milliseconds is common, some encoders may greatly exceed this value. Once the data streams have been verified, the application disables the VBI encoders and terminates the closed caption character stream in step 850.

The application then enters another loop in step 854, for monitoring the VTR for the end of material timecode. When the video out-point has been detected, the yes condition in step 854, in step 858 the HR encoder is commanded to stop, in step 862 the proxy encoders are commanded to stop, and in step 866 the VTR is commanded to stop. The video is then run through a video cataloger in step 870, using the proxy file as input. In an alternate embodiment, the video cataloging may have occurred concurrently as the file was encoded. After the cataloging has been completed, the generated storyboard is retrieved in step 874, and processed to add the absolute timecodes to the already captured relative timecodes. In step 878, a loop starts for each thumbnail, and the relative timecode is read in step 882 and used to locate the captured frame timecode packet in the proxy file in step 886. The absolute timecode is then read in step 890 and copied to the thumbnail in step 894. When all thumbnails are processed the loops exits, the modified storyboard is stored in the library in step 896. The encoding routine then posts a message to the workflow manager to signal ingest completion in step 898, and the routine returns to the caller in step 899.

MPEG File Processing

Figure 9A:
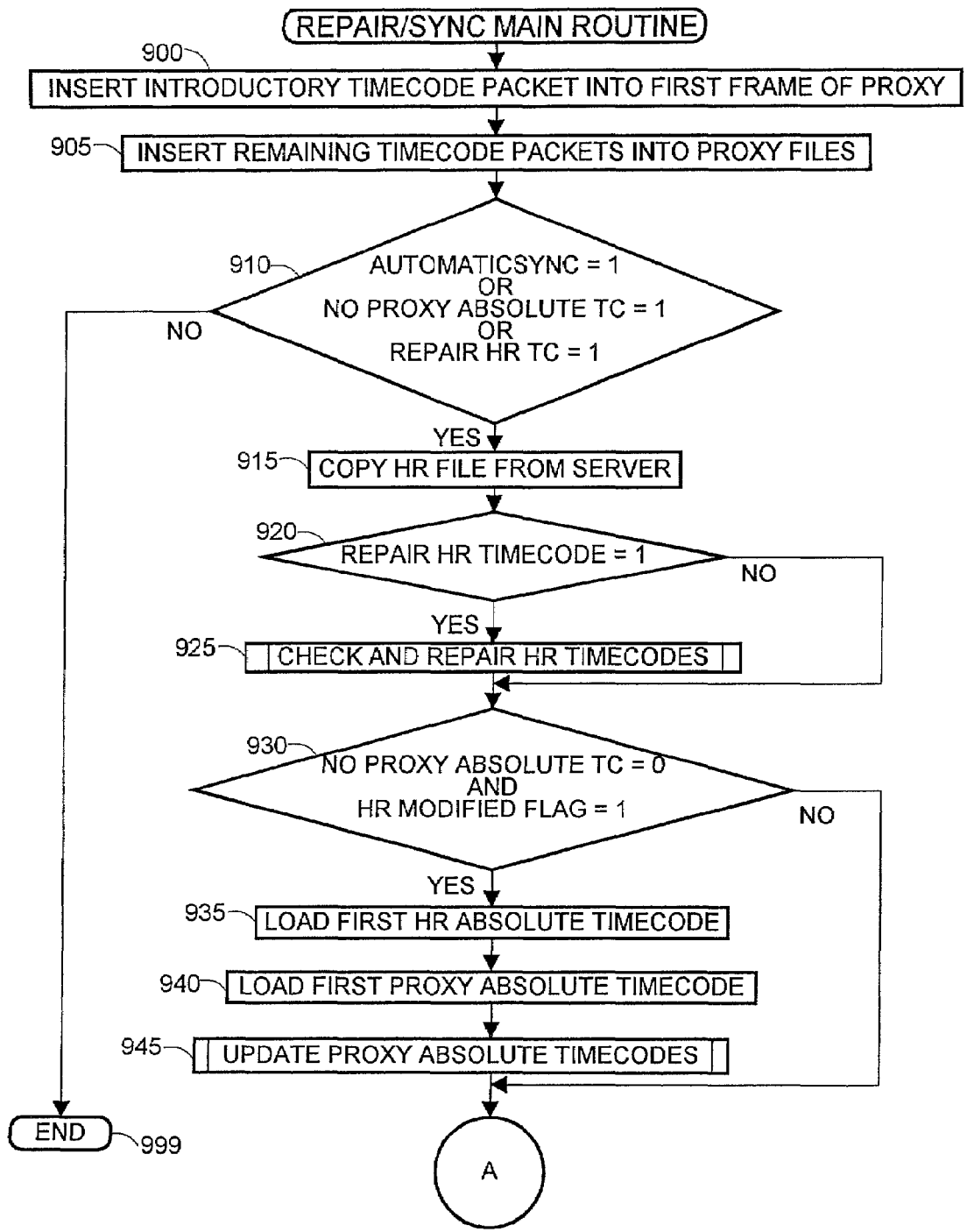
FIGS. 9A and 9B represent a logic flow diagram of the main software routine of the timecode repair/synchronization application, according to the preferred embodiments of the present invention.
Figure 9B:
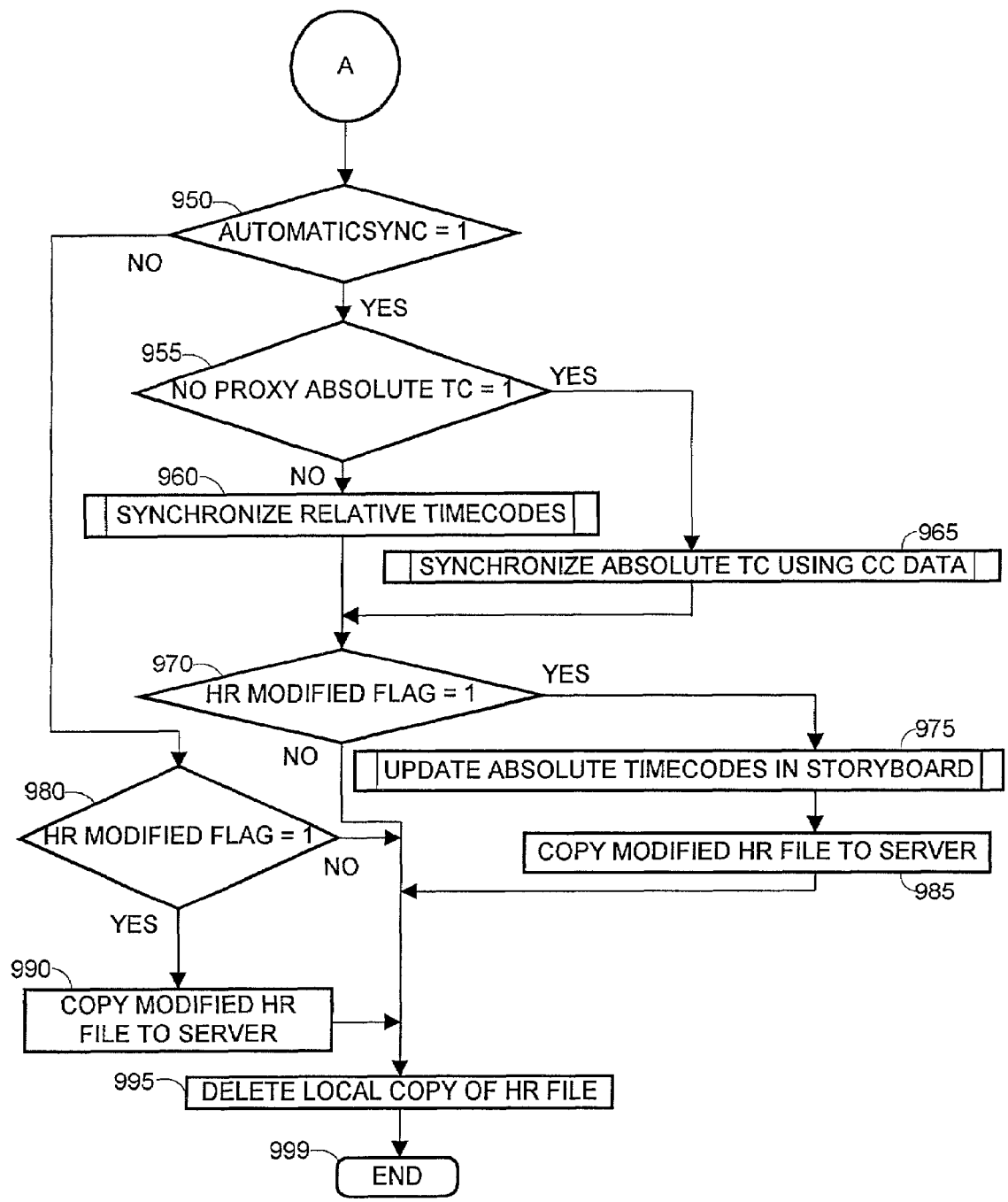

FIGS. 9A and 9B represent a logic flow diagram of the main software routine of the timecode repair/synchronization application, according to the preferred embodiments of the present invention. In the preferred embodiments, the application is automatically scheduled and invoked by the workflow manager. There are two primary input parameters that control application processing, Repair HR Timecode and AutomaticSync, both of which are enabled by default. The Repair HR Timecode parameter triggers the automatic detection and correction of anomalous timecodes. The AutomaticSync parameter enables the TRSA to automatically synchronize the proxy's relative timecodes with the relative timecodes of the HR file. A third parameter, No Proxy Absolute TC, is specified if the proxy encoders do not timestamp the proxy MPEG files with accurate, trustworthy SMPTE timecodes, that mirror the timestamping of the HR encoder. When this parameter is set to 1, the TRSA extracts the absolute timecodes from the HR file and inserts them into the proxy timecode packets. Furthermore, when this parameter is set, the TRSA uses closed captioning to align and synchronize the proxy and HR files, since the accuracy of the absolute timecodes is suspect. If none of the three input parameters are specified, the processing of the TRSA is limited to the insertion of the timecode packets into the proxy files. Finally, when the Repair HR Timecode parameter is set, there is a secondary input parameter that dictates how the bad timecode is to be corrected. The parameter value may be set to Repair Original Source, Use House Timecode or Use Elapsed Timecode.

In FIGS. 9A and 9B the application processing commences in step 900 by inserting the introductory timecode packet into the first video frame, and in step 905 by inserting the standard timecode packet into the remaining video frames If none of the three input parameters, AutomaticSync, No Proxy Absolute TC or Repair HR TC is found set in step 910, the applications ends in step 999. Otherwise, the HR MPEG file is retrieved from the broadcast video server in step 915, to read the absolute timecodes. The Repair HR TC parameter is tested in step 920, to determine if the HR timecodes should be examined and repaired. If the HR timecode repair parameter is enabled, the Check and Repair HR Timecode routine of FIG. 10 is called in step 925.

HR Timecode Repair

Figure 10:
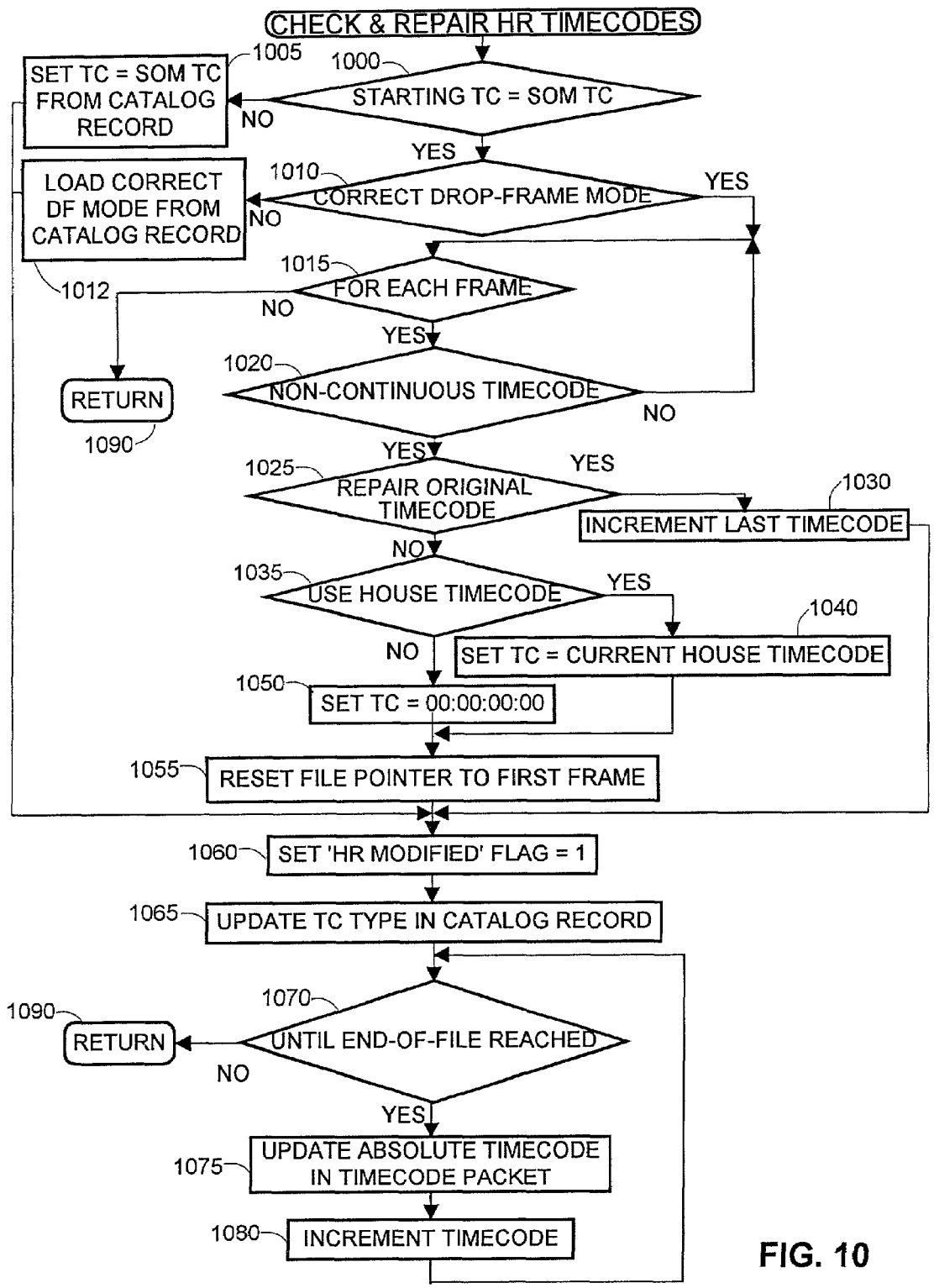
FIG. 10 is a logic flow diagram of a software routine for detecting and repairing timecode errors in a high-resolution file, according to the preferred embodiments of the present invention.

FIG. 10 is a logic flow diagram of a software routine for detecting and repairing timecode errors in a high-resolution file, according to the preferred embodiments of the present invention. In FIG. 10, in steps 1000 and 1010 the starting timecode and the drop-frame mode of the HR video are compared to the start-of-material (SOM) timecode and the drop-frame mode, respectively, as specified in the catalog record. If the HR file is compliant, a yes condition in both operations, the logic falls into a loop in step 1015, and each frame is tested for properly incrementing timecode in step 1020. The correct timecode results in the no condition in step 1020, and when the final frame has been tested, the loop exits in step 1015, and the routine returns in step 1090. A disruption of timecode detected in step 1020 causes a breakout of the loop and a timecode repair type parameter has to be tested to determine how to repair the discontinuous HR timecode.

If, in step 1025, it is found that the original timecode is to be repaired, the timecode of the previous frame is incremented by one frame in step 1030, and the code continues on to initiate the repair. If, in step 1035, it is found that the house timecode is to be used, the current house timecode is read in step 1040, and the file pointer is reset to the first frame (0) in step 1055, because the entire file needs to be restriped with timecode. If the use of the house timecode is not detected in step 1035, the code defaults to use elapsed timecode, the current timecode is reset to the first frame (0) in step 1050, and the file pointer is reset to the beginning of the first frame of the file in step 1055. Returning to the tests of steps 1000 and 1010, a failure of either test results in step 1005 for the correct timecode to be loaded from the catalog record, and in step 1012 for the drop-frame mode to be loaded from the catalog record.

The operation of FIG. 10 continues in step 1060 with restriping the HR absolute timecodes. Since the file pointer is currently set at the first frame of video, there is no need to reset it. The code paths for all corrective actions converge at step 1060, where the HR Modified global flag is set to 1. The setting of this flag will eventually result in the updating of both the proxy file and storyboard. The timecode type is then updated in the catalog record in step 1065, and the routine falls into a loop in step 1070, where the timecode of each remaining frame in the file is updated in step 1075, as the timecode is incremented in step 1080. When the end-of-file is detected in step 1070, the loop exits and the routine returns in step 1090.

Returning to FIGS. 9A and 9B, the processing advances to step 930, to test whether the absolute timecodes in the proxy file require updating. The proxy file is only updated if the proxy file has a reliable absolute timecode, and the HR file has had its absolute timecodes modified. Proxy files with unreliable absolute timecode will have its timecode aligned using closed caption data. If the proxy file requires timecode update, in steps 935, 940 the absolute timecodes of HR and proxy files are loaded, respectively, and passed in step 945 to the Update Proxy Absolute Timecodes routine of FIG. 11.

Updating Proxy Absolute Timecode

Figure 11:
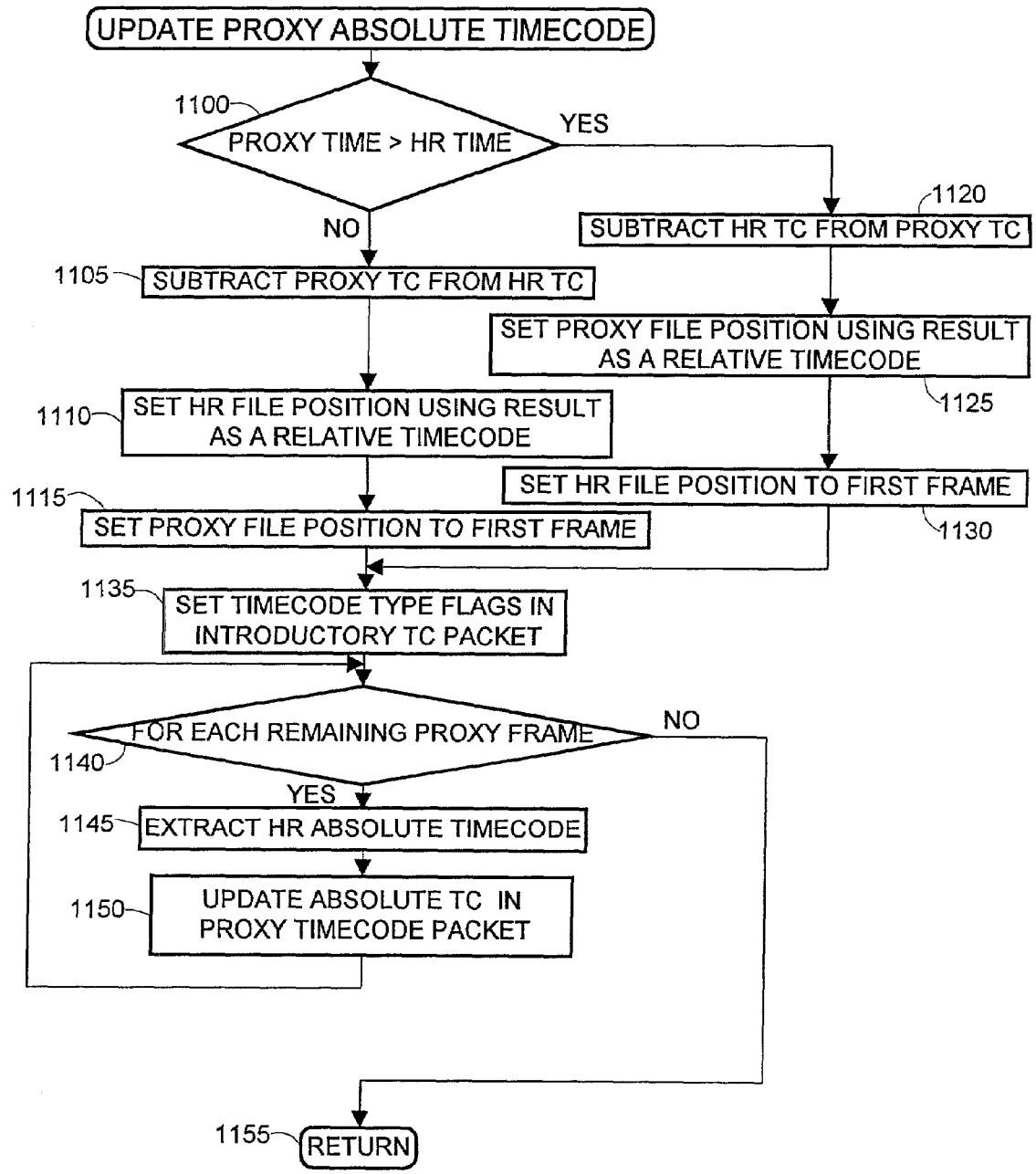
FIG. 11 is a logic flow diagram of a software routine for updating the absolute timecodes of a proxy file, according to the preferred embodiments of the present invention.

FIG. 11 is a logic flow diagram of a software routine for updating the absolute timecodes of a proxy file, according to the preferred embodiments of the present invention. Before the timecodes are copied from the HR file to the proxy file, the file pointers of the two files are set to point at the same video frame. In step 1100 of FIG. 11, the two input timecodes are compared to determine which file has the later timecode. If the proxy file has the later timecode, the HR timecode is subtracted from the proxy timecode in step 1120, and the result itself is used as a relative timecode with which to index into the proxy file in step 1125. Then, the HR file pointer is positioned at the first frame of video, in step 1130.

If the HR file timecode was found in step 1100 to be the larger of the two, the same process is conducted on the HR file timecode in steps 1105 and 1110, and the proxy file is set to the first frame of video, in step 1115. Then, the absolute timecode type flag is read from the catalog record and written into the proxy's introductory timecode packet in step 1135. In the subsequent processing loop, starting in step 1140, for each remaining frame of the proxy file, the absolute timecode is read from the corresponding HR frame in step 1145, and written into the proxy file timecode packet in step 1150, as absolute timecode. The routine returns in step 1155, when the loop of step 1140 exits on a no condition.

Figure 12:
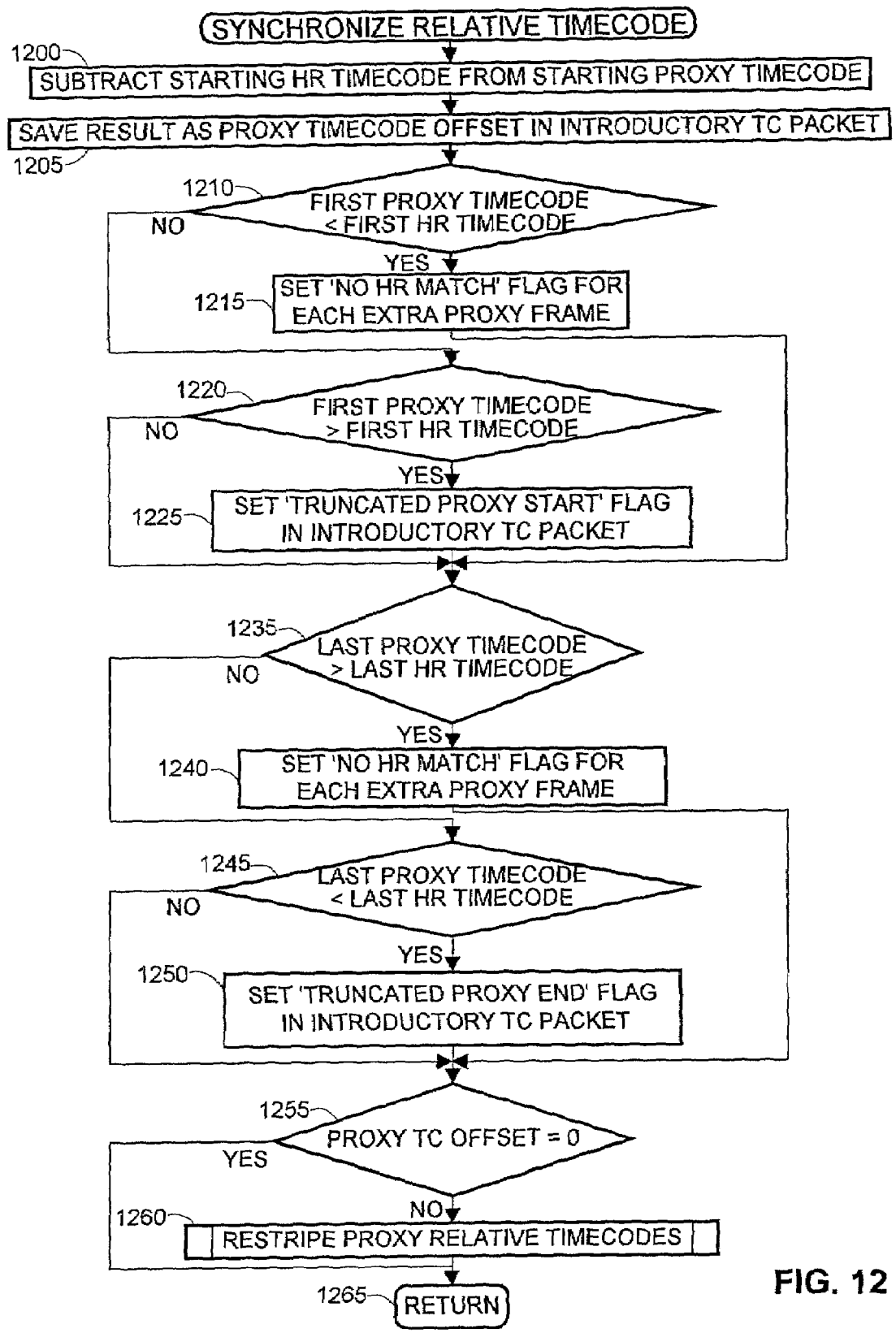
FIG. 12 is a logic flow diagram of a software routine for synchronizing a proxy file with its associated high-resolution video file, using absolute timecodes to align the two video streams, according to the preferred embodiments of the present invention.

Returning to the application's main routine of FIGS. 9A and 9B, the AutomaticSync input parameter is tested in step 950. If set, a further test is conducted to determine whether to synchronize absolute timecode by using proxy file absolute timecodes or closed caption characters. If the proxy file has trustworthy absolute timecodes, the no condition in test of step 955, the Synchronize Relative Timecodes routine of FIG. 12 is called in step 960. Otherwise, the Synchronize Absolute Timecode Using CC Data routine is invoked in step 965, to first synchronize the absolutes timecodes before processing the relative timecodes of the proxy file, according to FIG. 14.

Relative Timecode Synchronization

FIG. 12 is a logic flow diagram of a software routine for synchronizing relative timecode of a proxy file with its associated high-resolution video file, using relative timecodes to align the two video streams, according to the preferred embodiments of the present invention. In FIG. 12, synchronization from relative timecode begins by subtracting the starting HR timecode from the start proxy timecode in step 1200. This result, referred to as the proxy timecode offset, is then stored in the proxy's introductory timecode packet in step 1205. If, in step 1210, it is found that the starting proxy timecode is earlier than the starting HR timecode, the proxy encoder began encoding before the HR encoder and, in step 1215, the 'No HR Match' flag is set in the timecode packet of each extraneous proxy frame. The logic then continues to compare the end of the files. If the first proxy timecode was not found to be earlier than the first HR, in step 1210, the starting proxy timecode is retested in step 1220 to determine if it starts after the HR file timecode. If so, the 'Truncated Proxy Start' flag is set in the introductory timecode packet in step 1225. Otherwise, the proxy and HR files have equal starting times indicating synchronized timecodes.

In step 1235, the ending timecodes of the proxy and HR files are compared in a similar fashion. If the proxy ending timecode is greater than the HR, the 'No HR Match' flag is set in step 1240 in the trailing proxy frames. If, in step 1245, the proxy timecode is less than the HR timecode, the Truncated Proxy End is flagged in the introductory timecode packet in step 1250. Again, if both ending timecode comparisons fail, it indicates that both the proxy and HR encoders halted encoding on the same frame. After marking the extraneous trailing proxy frames, the proxy timecode offset value is tested for a value zero in step 1255, to determine if the proxy's relative timecode requires adjustment. If the offset equals zero, both files started on the same frame and the relative timecodes are in sync. Otherwise, the Restripe Proxy Relative Timecodes routine of FIG. 13 is called in step 1260 to adjust the proxy's relative timecodes accordingly, and the routine returns in step 1265.

Adjusting the Proxy's Relative Timecodes

Figure 13:
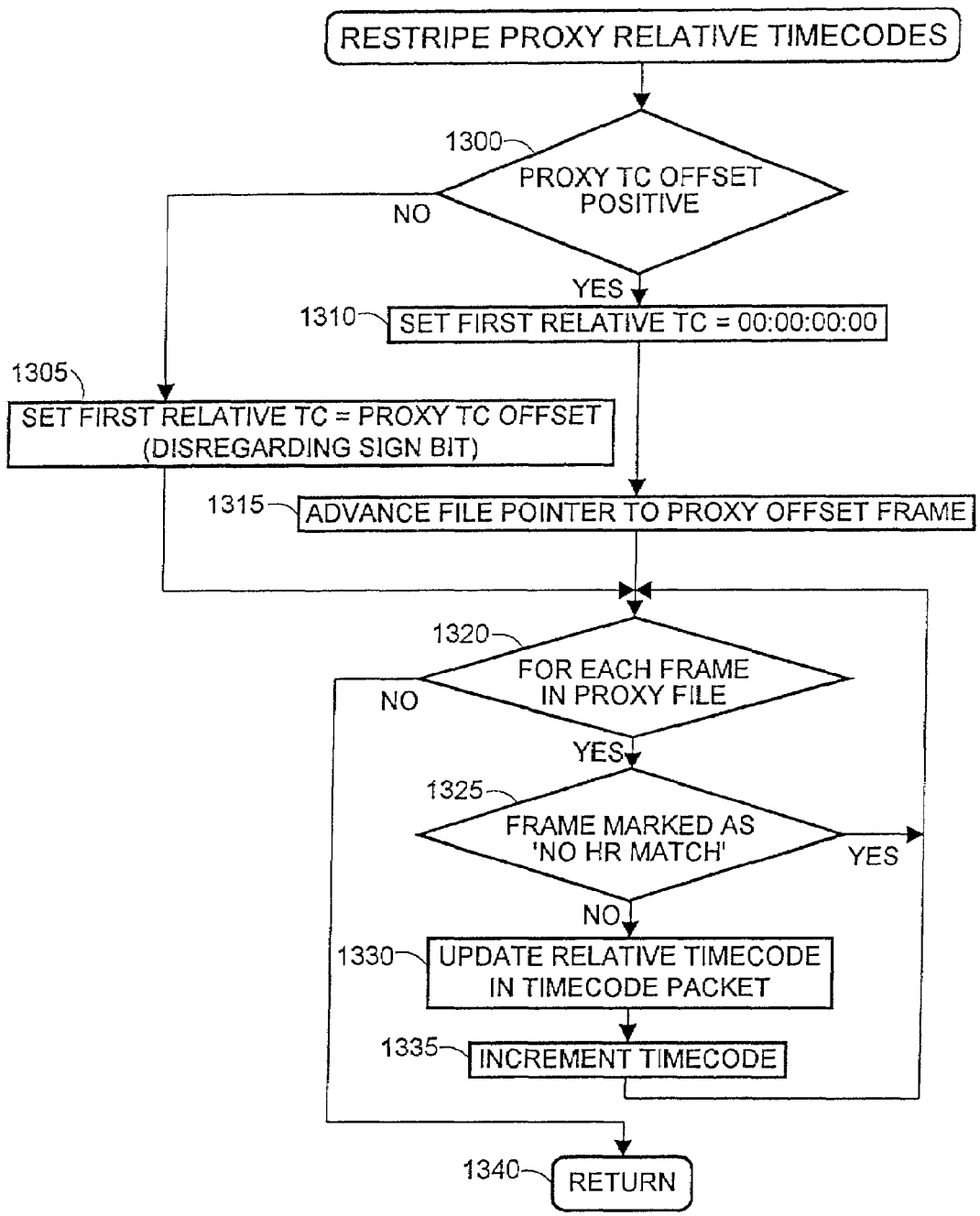
FIG. 13 is a logic flow diagram of a software routine for modifying the relative timecodes of a proxy file, according to the preferred embodiments of the present invention.

FIG. 13 is a logic flow diagram of a software routine for modifying and adjusting the relative timecodes of a proxy file, according to the preferred embodiments of the present invention. In FIG. 13, if the proxy timecode offset is found to be positive in step 1300, the proxy encoder started before the HR thus creating a timecode mismatch, as illustrated in FIG. 6. This is corrected by starting the first relative timecode at zero in step 1310, and advancing the file pointer to the offset of the proxy file frame, that will be designated as the first viewable frame, in step 1315. If the proxy timecode offset was not found to be positive in step 1300, it is converted to a positive integer and used as the first relative timecode in step 1305. With the value of the first relative timecode established, the routine enters a loop in step 1320, to process each frame in the proxy file. Ignoring the leading frames that have been found in step 1325 to be No HR Match, each of the subsequent video frames is assigned a new relative timecode in step 1330, and the timecode is incremented in SMPTE fashion in step 1335. When the last frame has been updated, the routine returns in step 1340.

Absolute Timecode Synchronization Using Closed Caption Data

Figure 14:
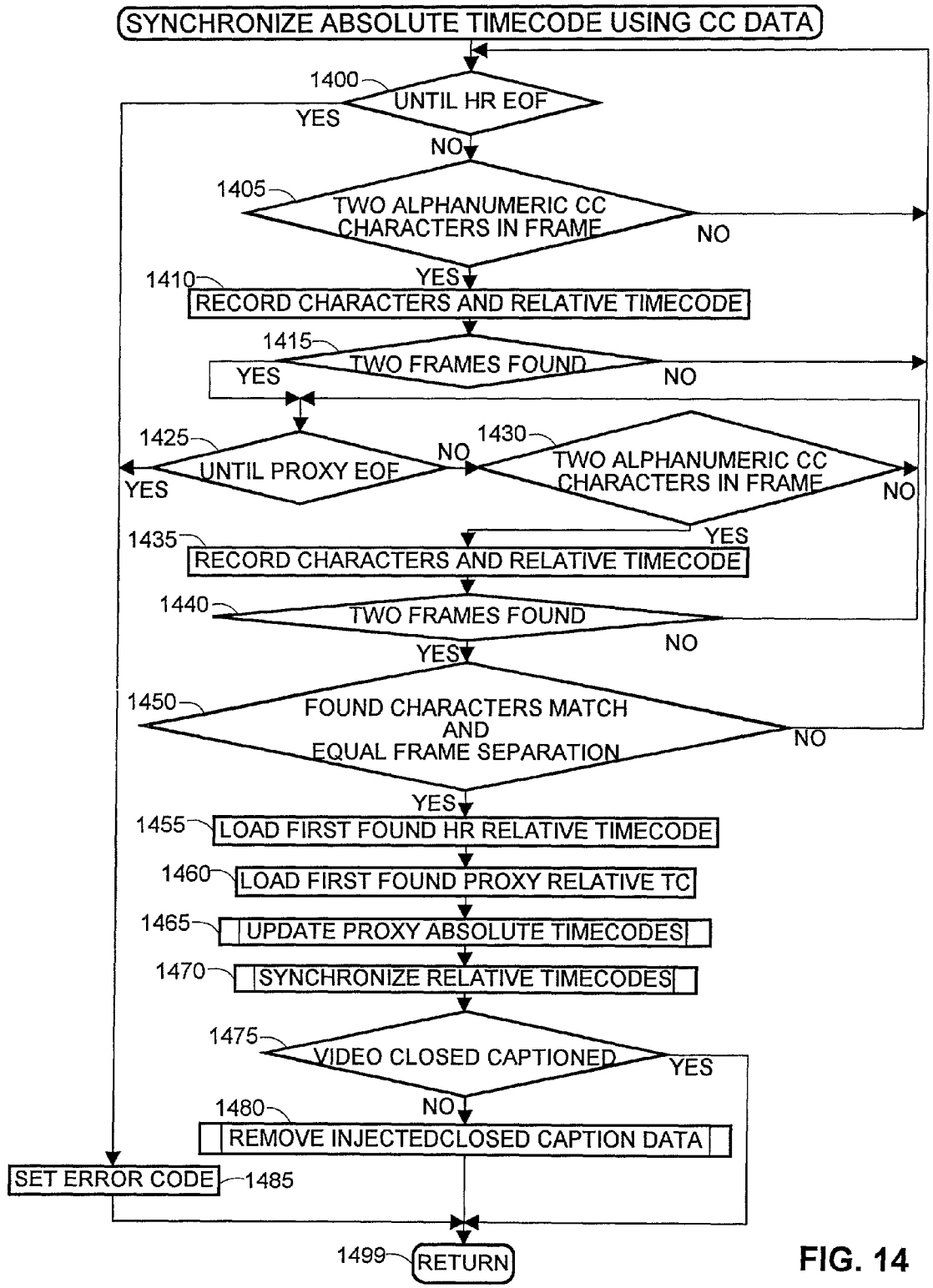
FIG. 14 is a logic flow diagram of a software routine for synchronizing a proxy file with its associated high-resolution video file, using encoded closed caption data to align the two video streams, according to the preferred embodiments of the present invention.

FIG. 14 is a logic flow diagram of a software routine for synchronizing a proxy file with its associated high-resolution video file, using encoded closed caption data to align the two video streams, according to the preferred embodiments of the present invention. In FIG. 14, the TRSA uses the encoded closed caption characters inserted into each frame to locate identical frames in the proxy and HR files for precise alignment, so that the absolute timecodes of the HR file may be copied over to the proxy file. Once the two files have identical absolute timecodes, the Synchronize Relative Timecodes routine is called to mark up the proxy file and synchronize the relative timecodes.

The routine of FIG. 14 begins by looping through the HR file in step 1400, extracting the closed caption data. When, in step 1405, a frame is found with two alphanumeric characters (this test specifically excludes the closed captioning control characters), the timecode and the found characters are recorded in step 1410. To ensure uniqueness, the loop iterates until a second frame with two alphanumeric characters is located in step 1415. The code then falls into an identical loop starting in step 1425, that processes the proxy file to locate two frames, each having a pair of alphanumeric closed caption characters, in steps 1430, 1435 and 1440. If the end-of-file is found in step 1400 or 1425 before two qualifying frames are found, and error code is set in step 1485, the routine exists in step 1499, and the files will have to be manually synchronized by an archive librarian.

After the two frames are found in each file, in step 1450 the two sets of characters extracted from each file are compared, to determine the amount of frame separation between the two samples. If the comparison test shows equal frame separation in both files, a yes condition, identical frames have been located in the two MPEG files, HR and proxy file, allowing the files to be synchronized. If the comparison fails, the logic returns to the top of the routine, step 1400, to resume the search from where it left off. Proceeding with a known frame offset, the first found relative HR timecode and proxy timecode, in step 1455 and 1460, respectively, are loaded and passed to the Update Proxy Absolute Timecodes routine of FIG. 11, in step 1465. This routine copies the absolute timecodes from the HR file frames to the corresponding proxy frames. The Synchronize Relative Timecodes routine is then invoked in 1470 to complete the synchronization. Upon return, if, in step 1475, it is found that close captioning was inserted by the ingest application, the Remove Injected Closed Caption Data routine is called in step 1480, to expunge the injected alphanumeric characters. The routine returns in step 1499.

Removing the Injected Close Caption Data

Figure 15A:
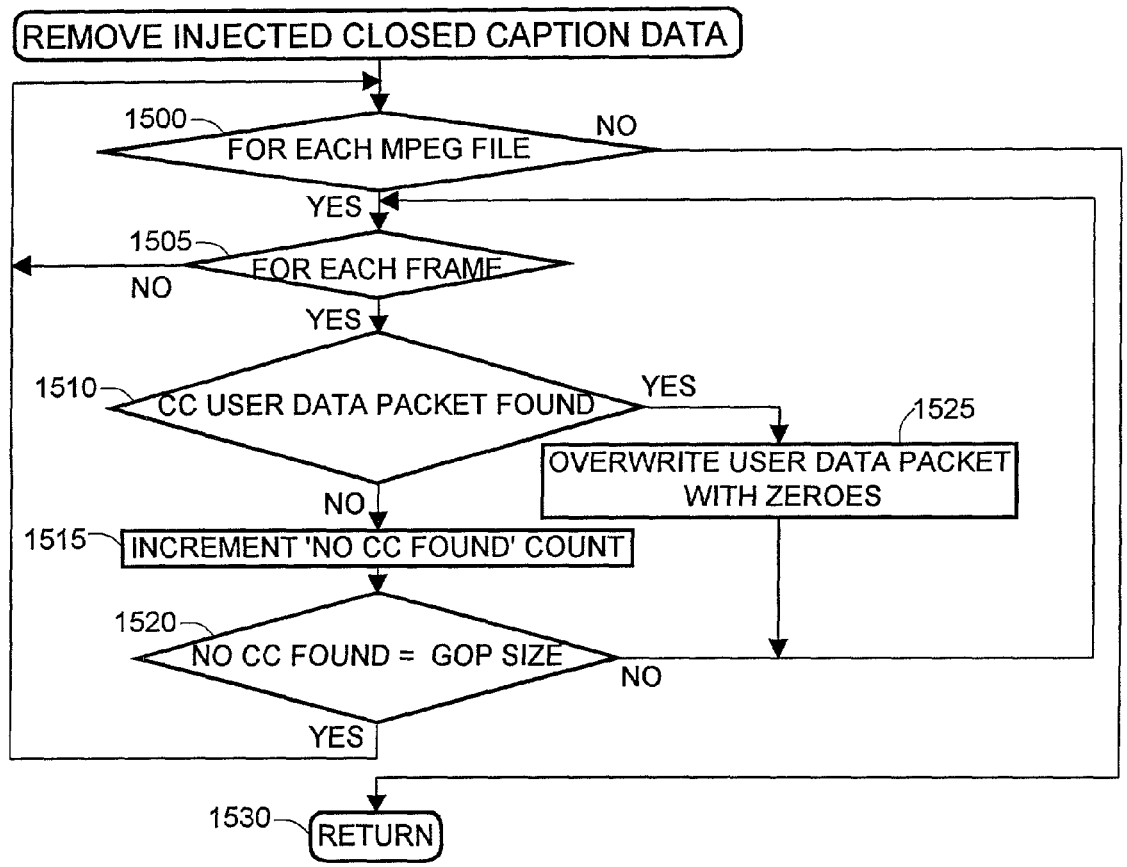
FIG. 15A illustrates the logic flow of a software routine for removing closed caption data from the MPEG files that were inserted by the timecode repair/synchronization application, according to the preferred embodiments of the present invention.

FIG. 15A illustrates the logic flow of a software routine for removing closed caption data from the MPEG files, that were inserted by the timecode repair/synchronization application, according to the preferred embodiments of the present invention. To remove the injected closed caption data from each MPEG file, in FIG. 15A the routine initiates an outer loop starting in step 1500 to process each encoded MPEG file. An inner loop is started in step 1505, which examines each frame of the chosen file for a closed caption user data packet. If a closed caption packet is discovered in step 1510, it is overwritten with zeros in step 1525, to prevent it from being decoded by the player. If no such packet was found, a 'no CC packet found' counter is incremented in step 1515, and the counter is compared in step 1520 to the file GOP size. Once an entire GOP is found to be free of closed caption packets in step 1520, it is safe to assume that all injected closed caption packet have been found and cleared, and the outer loop iterates to step 1500, to the next file.

Returning again to the main application routine of FIGS. 9A and 9B, after synchronization has been completed, the HR Modified global flag is tested in step 970 to determine if the HR absolute timecodes were modified. If so, the storyboard timecodes also need to be updated in Update Absolute Timecodes in Storyboard routine of FIG. 15B, to keep in synch with the actual high-resolution content.

Updating Storyboard Timecodes

Figure 15B:
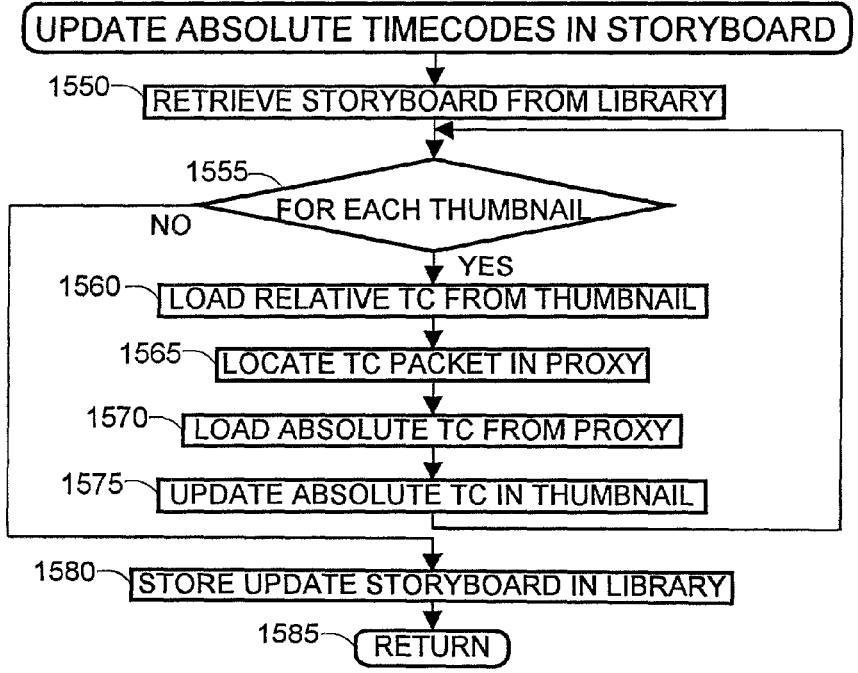
FIG. 15B is a logic flow diagram of a software routine for updating the absolute timecode of each thumbnail in the video storyboard, according to the preferred embodiments of the present invention.

FIG. 15B is a logic flow diagram of a software routine for updating the absolute timecode of each thumbnail in the video storyboard, according to the preferred embodiments of the present invention. In FIG. 15B, after retrieving the storyboard from the library in step 1550, the routine enters a loop in step 1555 to process each thumbnail in the storyboard. For each thumbnail found in step 1555, the thumbnail's relative timecode is loaded in step 1560, and used in step 1565 to index into the proxy file to locate the timecode packet. The proxy's absolute timecode is loaded in step 1570, and used to update the thumbnail's absolute timecode in step 1575. When the last thumbnail has been processed, the no condition in step 1555, the updated storyboard is saved in the library in step 1580 and the routine returns in step 1585.

Upon return, the main routine of FIGS. 9A and 9B copies the modified HR file to the broadcast server in step 985, the local copy of the HR file is deleted in step 995, and the application ends in step 999. If the test of step 950 for automatic synchronization resulted in the no condition, the HR Modified flag is checked in step 980, in case that the HR file underwent a timecode repair. If the HR file was updated, it is copied to the broadcast server in step 990, the local copy is purged in step 995 and the application ends in step 999.

Library Administrator's MPEG Decoder/Player/EDL Builder

The introductory and standard timecode packets are extracted, decompressed and stored into global memory by the MPEG Decoder/Player/Metadata Viewer/EDL Builder, as the file is decoded, to assist in composing EDL statements. The timecode information and synchronization metadata can be referenced by any application via an API interface.

Figure 16:
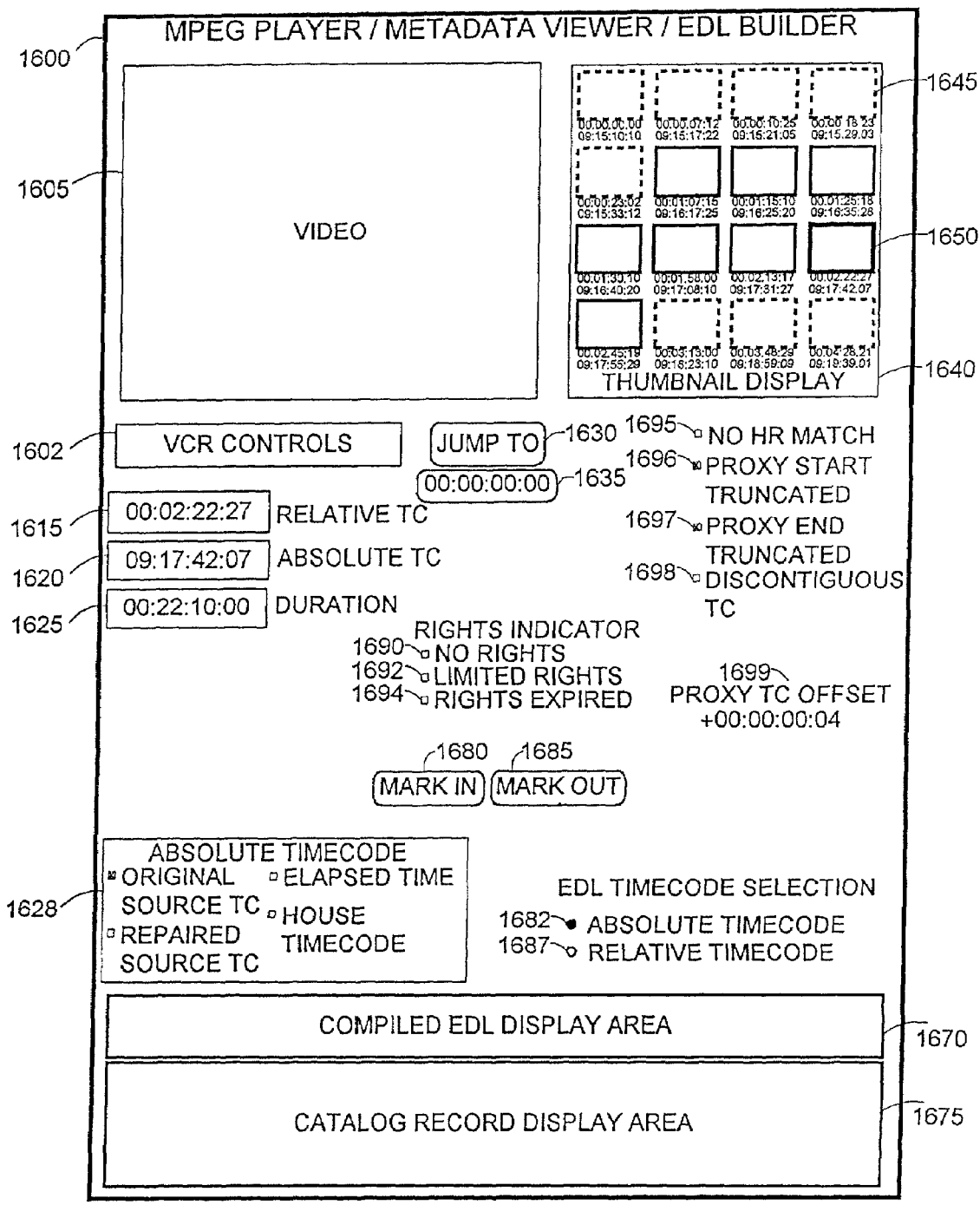
FIG. 16 is an illustration of the graphical user interface (GUI)) of the MPEG player and EDL builder, used by a video cataloging application to display streaming video and metadata, according to the preferred embodiments of the present invention.

FIG. 16 is an illustration of the graphical user interface (GUI) of the MPEG player, metadata viewer and the EDL builder 1600, used by a video cataloging application to display streaming video and synchronization metadata, according to the preferred embodiments of the present invention. In FIG. 16 VCR controls 1602 are provided, and a video display area 1605 reflects a stopped video with a current position of 00:02:22:27. Relative timecode 1615, absolute timecode 1620, and duration 1625 of the current frame are displayed. These timecodes are captured by the application in response to the end user clicking a mark-in 1680 and mark-out 1685 buttons, to define the starting and ending frames of a video clip. A jump to button 1630 and a timecode selected field 1635 are also provided. The lower portion of the window provides a display area for the catalog record 1675, and a compiled EDL display area 1670.

A storyboard display area 1640 contains 16 thumbnails 1645, 1650, each annotated with a relative and absolute timecode. An absolute timecode type field 1628 indicates that the timecode is an original source timecode in this example, and fields 1695, 1696, 1697 and 1698 indicate synchronization status as a no HR match 1695, a proxy start truncated 1696, a proxy end truncated 1697, or a discontiguous timecode 1698. The checked fields 1696 and 1697 inform the end user that both the beginning and end of the proxy video are truncated with respect to the high-resolution video file. A Proxy TC Offset field 1699 shows that the first frame of the proxy video starts 4 frames into the high-resolution video.

No HR match field 1695 is reset on this display. The fact that the discontiguous timecode field 1698 is reset, indicates that the absolute timecode is continuous for the duration of the video. Thus, it causes the EDL builder to automatically select an absolute timecode on an absolute timecode button 1682, when composing EDL statements. The end user however may override this setting and select a relative timecode on a relative timecode button 1687, if anomalous timecodes in the storyboard and proxy file are detected, and to use relative timecodes when generating EDL statements.

Manually Synchronizing the Proxy and High-resolution Files

Figure 17:
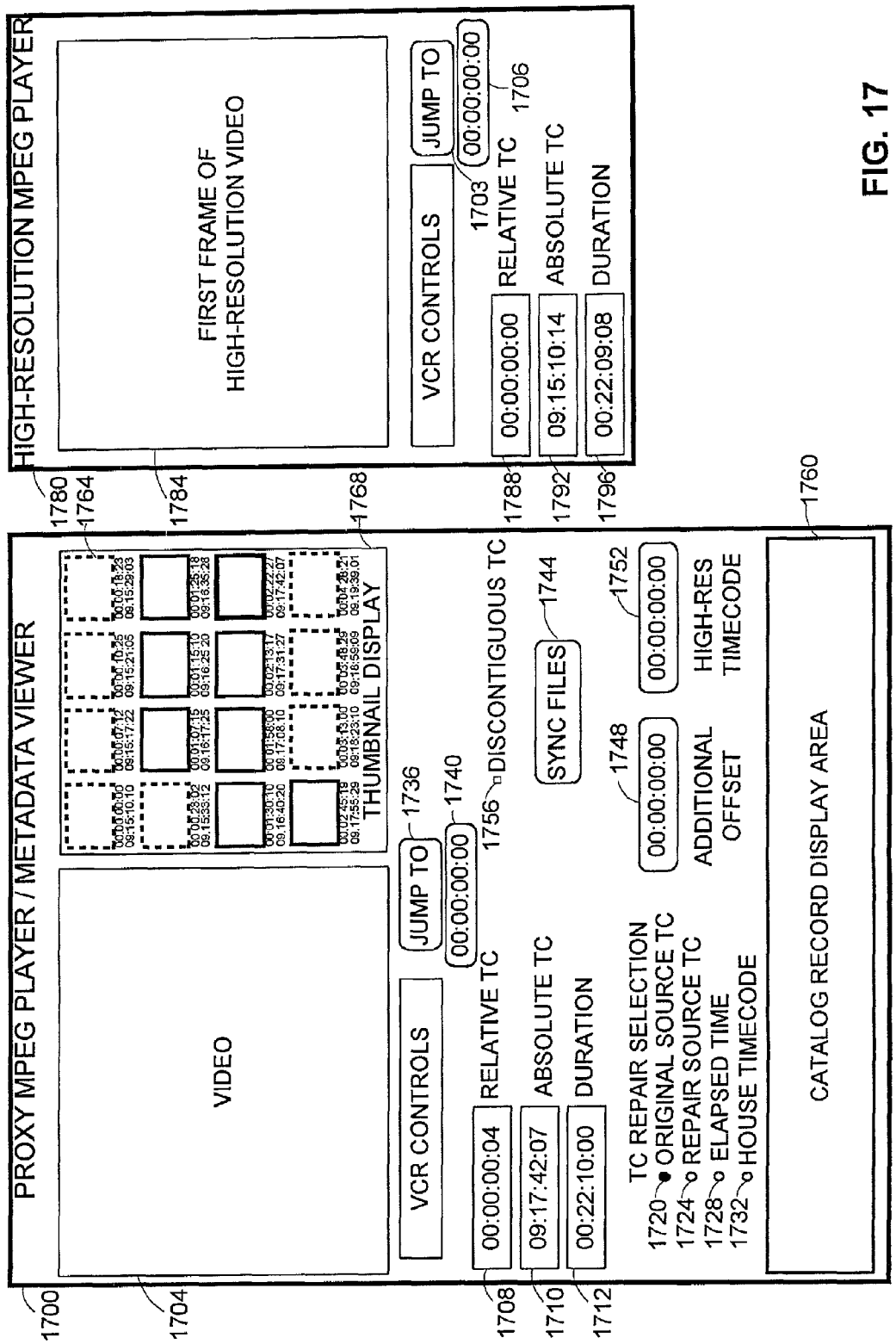
FIG. 17 is an illustration of the graphical user interface used by a video cataloging application to view both the high-resolution and the proxy videos for the purpose of manual synchronization, according to the preferred embodiments of the present invention.

In another preferred embodiment of the present invention the synchronization of the HR file and proxy file is performed manually, by a librarian. FIG. 17 is an illustration of the graphical user interface used by a video cataloging application to view both the high-resolution and the proxy videos for the purpose of manual synchronization, according to the preferred embodiments of the present invention. Preferably, the HR file is decoded with a hardware MPEG decoder which is capable of displaying the video on either a computer monitor 1780 (as shown) or on a separate video monitor. The proxy video is decoded with a software MPEG decoder/player 1700.

The MPEG decoder/player 1700 has a relative timecode 1708, absolute timecode 1710, and duration 1712 of the current frame display areas. A jump to button 1736 and a timecode select button 1740 are also provided. The lower portion of the window provides a display area for a catalog record 1760. A discontiguous TC indicator 1756 is also shown. A storyboard display area 1768 contains 16 thumbnails 1764, each annotated with a relative and absolute timecode. The computer monitor 1780 has a relative timecode 1788, absolute timecode 1792, and duration 1796 of the current frame display fields. A jump to button 1703 and a timecode select button 1706 are also provided.

The librarian displays and freezes the first frame of a high-resolution video 1784, and then steps through the proxy video frames 1704, one frame at a time, until the corresponding frame is found. After selecting one of four timecode repair modes using an original source timecode button 1720, a repair source timecode button 1724, an elapsed timecode button 1728, or a house timecode button 1732, the user presses a synchronize files button 1744 to record the beginning timecode of the proxy file, and the TRSA synchronizes the proxy file with the HR file, accordingly. When synchronizing a video that fades out of black over several frames, the HR file must be frozen on a non-black frame, at some offset into the file. In this case, the user must enter the frame offset into an additional offset timecode field 1748, before clicking the synchronize files button 1744. This procedure synchronizes files when the proxy file begins before the HR file, as depicted in FIG. 6.

To fix up a proxy file that started encoding after the HR file, as seen in FIG. 7, the librarian must display the first frame of the proxy file and find the corresponding frame in the HR file. When found, the high-resolution timecode must be entered in a high-resolution timecode field 1752, before commanding synchronization by pressing the synchronize files button 1744.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of processing a previously encoded MPEG video high-resolution (HR) file and corresponding proxy file, for frame accurate timecode repair and synchronization of individual video frames of the HR file and proxy file, comprising the following steps:
   (a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;
   (b) modifying the HR file and proxy file by inserting in a header of each video frame of the HR file and proxy file the corresponding compressed timecode packet, while maintaining the files' original frame presentation timing;
   (c) automatically verifying the timecodes in the HR file and proxy file timecode packets;
   (d) if needing a repair of the HR file anomalous absolute timecodes, automatically correcting the anomalous absolute timecodes in the HR file timecode packets; and
   (e) if the proxy file starting video frame being offset from the HR file starting video frame, automatically synchronizing the proxy file and the HR file absolute timecodes and relative timecodes in the timecode packets,
   thereby preserving the MPEG compliance and compressed audio/video data of the HR file and proxy file.

2. The method according to claim 1, wherein the timecode packet being automatically inserted in a user data packet of the video frame, between a picture start header and a first slice header.

3. The method according to claim 1, wherein the step of inserting the timecode packet including a step of periodically removing the MPEG video file unused data bytes, equal in number with the inserted timecode packet bytes, for preserving the MPEG video file original size and multiplex bitrate.

4. The method according to claim 1, wherein the step of inserting the timecode packet including a step of increasing the MPEG video file original multiplex bitrate, to compensate for additional timecode packet bytes inserted into the MPEG video file.

5. The method according to claim 1, wherein the step (d) further comprising a step for updating the absolute timecodes in the proxy file timecode packets.

6. The method according to claim 1, wherein the step (d) further comprising a step for updating absolute timecodes of each storyboard thumbnail for enabling frame-accurate composition of an edit decision list (EDL).

7. The method according to claim 1, wherein the step (e) further comprising:
   a step for inserting a synchronization metadata into the proxy file, for signaling an offset and disparity in duration of the proxy file and HR file, a timecode repair action taken, and a timecode type identifying a source of the absolute timecode as chosen from a group comprising an original source timecode, repaired timecode, elapsed timecode or house timecode, and
   a step for marking affected frames of the proxy file as unviewable, when no corresponding frame found in the HR file.

8. The method according to claim 1, wherein the step (e) comprising: a step for aligning the HR file video frames and proxy file video frames using absolute timecodes, and a step for updating the relative timecodes in the proxy file timecode packets with the relative timecodes of the HR file.

9. The method according to claim 8, wherein in the aligning step of step (e), if the proxy file having accurate absolute timecodes, aligning the absolute timecodes of the HR file and proxy file, and if not, using closed captioning for aligning the proxy file and HR file, and copying the absolute timecodes from the HR file into the proxy file timecode packets.

10. The method according to claim 9, wherein the closed captioning step, if the HR file and proxy file not being closed captioned, further comprising a step, at the start of the aligning step, for inserting into a predetermined number of video frames of the HR file and proxy file a closed caption data stream for locating and aligning an identical video frame in the HR file and proxy file, and, after the file aligning step, a step for removing the inserted closed caption data stream from the HR file and proxy file.

11. A system for processing a previously encoded MPEG video high-resolution (HR) file and corresponding proxy file, for frame accurate timecode repair and synchronization of individual video frames of the HR file and proxy file, comprising:
   a computer coupled to an electronic storage device for storing the MPEG video files;
   programming means, performed by the computer, for creating for each video frame of the HR file and proxy file, a compressed timecode packet having an identifying signature, an absolute timecode of the frame, a relative timecode of the frame, a picture type and a picture reference, wherein the timecodes having the SMPTE timecode format HH:MM:SS:FF;
   programming means, performed by the computer, for modifying the HR file and proxy file by inserting in a header of each video frame of the HR file and proxy file the corresponding compressed timecode packet, while maintaining the files' original frame presentation timing;
   programming means, performed by the computer, for automatically verifying the timecodes in the HR file and proxy file timecode packets;
   programming means, performed by the computer, for automatically correcting the anomalous absolute timecodes in the HR file timecode packets; and
   programming means, performed by the computer, for automatically synchronizing the proxy file and the HR file absolute timecodes and relative timecodes in the timecode packets,
   thereby preserving the MPEG compliance and compressed audio/video data of the MPEG video file.

12. The system according to claim 11, wherein the timecode packet being automatically inserted in a user data packet of the video frame, between a picture start header and a first slice header.

13. The system according to claim 11, wherein the means for inserting the timecode packet further comprising means for periodically removing the MPEG video file unused data bytes, equal in number with the inserted timecode packet bytes, for preserving the MPEG video file original size and multiplex bitrate.

14. The system according to claim 11, wherein the means for inserting the timecode packet further comprising means for increasing the MPEG video file original multiplex bitrate, to compensate for additional timecode packet bytes inserted into the MPEG video file.

15. The system according to claim 11, wherein the means for automatically correcting the anomalous absolute timecodes in the HR file timecode packets further comprising means for updating the absolute timecodes in the proxy file timecode packets.

16. The system according to claim 11, wherein the means for automatically correcting the anomalous absolute timecodes in the HR file timecode packets further comprising means for updating absolute timecodes of each storyboard thumbnail for enabling frame-accurate composition of an edit decision list (EDL).

17. The system according to claim 11, wherein the means for automatically synchronizing the proxy file and the HR file absolute timecodes and relative timecodes in the timecode packets further comprising:
   means for inserting a synchronization metadata into the proxy file, for signaling an offset and disparity in duration of the proxy file and HR file, a timecode repair action taken, and a timecode type identifying a source of the absolute timecode as chosen from a group comprising an original source timecode, repaired timecode, elapsed timecode or house timecode, and
   means for marking affected frames of the proxy file as unviewable, when no corresponding frame found in the HR file.

18. The system according to claim 11, wherein the means for automatically synchronizing the proxy file and the HR file absolute timecodes and relative timecodes in the timecode packets comprising: means for aligning the HR file video frames and proxy file video frames using absolute timecodes, and means for updating the relative timecodes in the proxy file timecode packets with the relative timecodes of the HR file.

19. The system according to claim 18, wherein the means for automatically synchronizing the proxy file and the HR file absolute timecodes and relative timecodes in the timecode packets comprising: means for aligning the absolute timecodes of the HR file and proxy file, and closed captioning means for aligning the proxy file and HR file and copying the absolute timecodes from the HR file into the proxy file timecode packets.

20. The system according to claim 19, wherein the closed captioning means further comprising: means for inserting into a predetermined number of video frames of the HR file and proxy file a closed caption data stream for locating and aligning an identical video frame in the HR file and proxy file, and means for removing the inserted closed caption data stream from the HR file and proxy file after the alignment.

21. A program storage device readable by a computer tangibly embodying a program of instructions executable by the computer to perform method steps of processing a previously encoded MPEG video high-resolution (HR) file and corresponding proxy file, for frame accurate timecode repair and synchronization of individual video frames of the HR file and proxy file, the MPEG video files stored in an electronic storage device coupled to the computer, the method comprising the following steps:
   (a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;
   (b) modifying the HR file and proxy file by inserting in a header of each video frame of the HR file and proxy file the corresponding compressed timecode packet, while maintaining the files' original frame presentation timing;
   (c) automatically verifying the timecodes in the HR file and proxy file timecode packets;
   (d) if needing a repair of the HR file anomalous absolute timecodes, automatically correcting the anomalous absolute timecodes in the HR file timecode packets; and
   (e) if the proxy file starting video frame being offset from the HR file starting video frame, automatically synchronizing the proxy file and the HR file absolute timecodes and relative timecodes in the timecode packets,
   thereby preserving the MPEG compliance and compressed audio/video data of the HR file and proxy file.

22. The method according to claim 21, wherein the timecode packet being automatically inserted in a user data packet of the video frame, between a picture start header and a first slice header.

23. The method according to claim 21, wherein the step of inserting the timecode packet including a step of periodically removing the MPEG video file unused data bytes, equal in number with the inserted timecode packet bytes, for preserving the MPEG video file original size and multiplex bitrate.

24. The method according to claim 21, wherein the step of inserting the timecode packet including a step of increasing the MPEG video file original multiplex bitrate, to compensate for additional timecode packet bytes inserted into the MPEG video file.

25. The method according to claim 21, wherein the step (d) further comprising a step for updating the absolute timecodes in the proxy file timecode packets.

26. The method according to claim 21, wherein the step (d) further comprising a step for updating absolute timecodes of each storyboard thumbnail for enabling frame-accurate composition of an edit decision list (EDL).

27. The method according to claim 21, wherein the step (e) further comprising:
   a step for inserting a synchronization metadata into the proxy file, for signaling an offset and disparity in duration of the proxy file and HR file, a timecode repair action taken, and a timecode type identifying a source of the absolute timecode as chosen from a group comprising an original source timecode, repaired timecode, elapsed timecode or house timecode, and
   a step for marking affected frames of the proxy file as unviewable, when no corresponding frame found in the HR file.

28. The method according to claim 21, wherein the step (e) comprising: a step for aligning the HR file video frames and proxy file video frames using absolute timecodes, and a step for updating the relative timecodes in the proxy file timecode packets with the relative timecodes of the HR file.

29. The method according to claim 28, wherein in the aligning step of step (e), if the proxy file having accurate absolute timecodes, aligning the absolute timecodes of the HR file and proxy file, and if not, using closed captioning for aligning the proxy file and HR file, and copying the absolute timecodes from the HR file into the proxy file timecode packets.

30. The method according to claim 29, wherein the closed captioning step, if the HR file and proxy file not being closed captioned, further comprising a step, at the start of the aligning step, for inserting into a predetermined number of video frames of the HR file and proxy file a closed caption data stream for locating and aligning an identical video frame in the HR file and proxy file, and, after the file aligning step, a step for removing the inserted closed caption data stream from the HR file and proxy file.

31. A method of processing a previously encoded MPEG video high-resolution (HR) file and corresponding proxy file, for frame accurate timecode repair and synchronization of individual video frames of the HR file and proxy file, comprising the following steps:
   (a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;
   (b) modifying the HR file and proxy file by inserting in a header of each video frame of the HR file and proxy file the corresponding compressed timecode packet, while maintaining the files' original frame presentation timing;
   (c) automatically verifying the timecodes in the HR file and proxy file timecode packets; and
   (d) if the proxy file starting video frame being offset from the HR file starting video frame, automatically synchronizing the proxy file and the HR file absolute timecodes and relative timecodes in the timecode packets,
   thereby preserving the MPEG compliance and compressed audio/video data of the HR file and proxy file.

32. The method according to claim 31, wherein the step (d) further comprising:
   a step for inserting a synchronization metadata into the proxy file, for signaling an offset and disparity in duration of the proxy file and HR file, a timecode repair action taken, and a timecode type identifying a source of the absolute timecode as chosen from a group comprising an original source timecode, repaired timecode, elapsed timecode or house timecode, and
   a step for marking affected frames of the proxy file as unviewable, when no corresponding frame found in the HR file.

33. The method according to claim 31, wherein the step (d) comprising: a step for aligning the HR file video frames and proxy file video frames using absolute timecodes, and a step for updating the relative timecodes in the proxy file timecode packets with the relative timecodes of the HR file.

34. The method according to claim 33, wherein in the aligning step of step (d), if the proxy file having accurate absolute timecodes, aligning the absolute timecodes of the HR file and proxy file, and if not, using closed captioning for aligning the proxy file and HR file, and copying the absolute timecodes from the HR file into the proxy file timecode packets.

35. The method according to claim 34, wherein the closed captioning step, if the HR file and proxy file not being closed captioned, further comprising a step, at the start of the aligning step, for inserting into a predetermined number of video frames of the HR file and proxy file a closed caption data stream for locating and aligning an identical video frame in the HR file and proxy file, and, after the file aligning step, a step for removing the inserted closed caption data stream from the HR file and proxy file.

36. A method of processing a previously encoded MPEG video high-resolution (HR) file and corresponding proxy file, for frame accurate timecode repair and synchronization of individual video frames of the HR file and proxy file, comprising the following steps:
   (a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;
   a computer coupled to an electronic storage device for storing the MPEG video files;
   programming means, performed by the computer, for creating for each video frame of the HR file and proxy file, a compressed timecode packet having an identifying signature, an absolute timecode of the frame, a relative timecode of the frame, a picture type and a picture reference, wherein the timecodes having the SMPTE timecode format HH:MM:SS:FF;

programming means, performed by the computer, for modifying the HR file and proxy file by inserting in a header of each video frame of the HR file and proxy file the corresponding compressed timecode packet, while maintaining the files' original frame presentation timing;

programming means, performed by the computer, for automatically verifying the timecodes in the HR file and proxy file timecode packets; and programming means, performed by the computer, for automatically synchronizing the proxy file and the HR file absolute timecodes and relative timecodes in the timecode packets, thereby preserving the MPEG compliance and compressed audio/video data of the MPEG video file.

37. The method according to claim 36, wherein the step (d) further comprising a step for updating the absolute timecodes in the proxy file timecode packets.

38. The method according to claim 36, wherein the step (d) further comprising a step for updating absolute timecodes of each storyboard thumbnail for enabling frame-accurate composition of an edit decision list (EDL).

39. A system for processing a previously encoded MPEG video high-resolution (HR) file and corresponding proxy file, for frame accurate timecode repair and synchronization of individual video frames of the HR file and proxy file, comprising:

means for marking affected frames of the proxy file as unviewable, when no corresponding frame found in the HR file.

40. The system according to claim 39, wherein the means for automatically synchronizing the proxy file and the HR file absolute timecodes and relative timecodes in the timecode packets further comprising:

means for inserting a synchronization metadata into the proxy file, for signaling an offset and disparity in duration of the proxy file and HR file, a timecode repair action taken, and a timecode type identifying a source of the absolute timecode as chosen from a group comprising an original source timecode, repaired timecode, elapsed timecode or house timecode, and (b) modifying the HR file and proxy file by inserting in a header of each video frame of the HR file and proxy file the corresponding compressed timecode packet, while maintaining the files' original frame presentation timing;

(c) automatically verifying the timecodes in the HR file and proxy file timecode packets; and (d) if needing a repair of the HR file anomalous absolute timecodes, automatically correcting the anomalous absolute timecodes in the HR file timecode packets, thereby preserving the MPEG compliance and compressed audio/video data of the HR file and proxy file.

41. The system according to claim 39, wherein the means for automatically synchronizing the proxy file and the HR file absolute timecodes and relative timecodes in the timecode packets comprising: means for aligning the HR file video frames and proxy file video frames using absolute timecodes, and means for updating the relative timecodes in the proxy file timecode packets with the relative timecodes of the HR file.

42. The system according to claim 41, wherein the means for automatically synchronizing the proxy file and the HR file absolute timecodes and relative timecodes in the timecode packets comprising: means for aligning the absolute timecodes of the HR file and proxy file, and closed captioning means for aligning the proxy file and HR file and copying the absolute timecodes from the HR file into the proxy file timecode packets.

43. The system according to claim 42, wherein the closed captioning means further comprising: means for inserting into a predetermined number of video frames of the HR file and proxy file a closed caption data stream for locating and aligning an identical video frame in the HR file and proxy file, and means for removing the inserted closed caption data stream from the HR file and proxy file after the alignment.

44. A system for processing a previously encoded MPEG video high-resolution (HR) file and corresponding proxy file, for frame accurate timecode repair and synchronization of individual video frames of the HR file and proxy file, comprising:

a computer coupled to an electronic storage device for storing the MPEG video files;

programming means, performed by the computer, for creating for each video frame of the FHR file and proxy file, a compressed timecode packet having an identifying signature, an absolute timecode of the frame, a relative timecode of the frame, a picture type and a picture reference, wherein the timecodes having the SMPTE timecode format HH:MM:SS:FF;

programming means, performed by the computer, for modifying the HR file and proxy file by inserting in a header of each video frame of the HR file and proxy file the corresponding compressed timecode packet, while maintaining the files' original frame presentation timing;

programming means, performed by the computer, for automatically verifying the timecodes in the HR file and proxy file timecode packets; and programming means, performed by the computer, for automatically correcting the anomalous absolute timecodes in the HR file timecode packets, thereby preserving the MPEG compliance and compressed audio/video data of the MPEG video file.

45. The system according to claim 44, wherein the means for automatically correcting the anomalous absolute timecodes in the HR file timecode packets further comprising means for updating the absolute timecodes in the proxy file timecode packets.

46. The system according to claim 44, wherein the means for automatically correcting the anomalous absolute timecodes in the HR file timecode packets further comprising means for updating absolute timecodes of each storyboard thumbnail for enabling frame-accurate composition of an edit decision list (EDL).

47. A program storage device readable by a computer tangibly embodying a program of instructions executable by the computer to perform method steps of processing a previously encoded MPEG video high-resolution (HR) file and corresponding proxy file, for frame accurate timecode repair and synchronization of individual video frames of the HR file and proxy file, the MPEG video files stored in an electronic storage device coupled to the computer, the method comprising the following steps:

(a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;

(b) modifying the HR file and proxy file by inserting in a header of each video frame of the HR file and proxy file the corresponding compressed timecode packet, while maintaining the files' original frame presentation timing;

(c) automatically verifying the timecodes in the HR file and proxy file timecode packets; and (d) if the proxy file starting video frame being offset from the HR file starting video frame, automatically synchronizing the proxy file and the HR file absolute timecodes and relative timecodes in the timecode packets, thereby preserving the MPEG compliance and compressed audio/video data of the HR file and proxy file.

48. The method according to claim 47, wherein the step (d) further comprising:

a step for inserting a synchronization metadata into the proxy file, for signaling an offset and disparity in duration of the proxy file and HR file, a timecode repair action taken, and a timecode type identifying a source of the absolute timecode as chosen from a group comprising an original source timecode, repaired timecode, elapsed timecode or house timecode, and a step for marking affected frames of the proxy file as unviewable, when no corresponding frame found in the HR file.

49. The method according to claim 47, wherein the step (d) comprising: a step for aligning the HR file video frames and proxy file video frames using absolute timecodes, and a step for updating the relative timecodes in the proxy file timecode packets with the relative timecodes of the HR file.

50. The method according to claim 49, wherein in the aligning step of step (d), if the proxy file having accurate absolute timecodes, aligning the absolute timecodes of the HR file and proxy file, and if not, using closed captioning for aligning the proxy file and HR file, and copying the absolute timecodes from the HR file into the proxy file timecode packets.

51. The method according to claim 50, wherein the closed captioning step, if the HR file and proxy file not being closed captioned, further comprising a step, at the start of the aligning step, for inserting into a predetermined number of video frames of the HR file and proxy file a closed caption data stream for locating and aligning an identical video frame in the HR file and proxy file, and, after the file aligning step, a step for removing the inserted closed caption data stream from the HR file and proxy file.

52. A program storage device readable by a computer tangibly embodying a program of instructions executable by the computer to perform method steps of processing a previously encoded MPEG video high-resolution (HR) file and corresponding proxy file, for frame accurate timecode repair and synchronization of individual video frames of the HR file and proxy file, the MPEG video files stored in an electronic storage device coupled to the computer, the method comprising the following steps:

(a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;

(b) modifying the HR file and proxy file by inserting in a header of each video frame of the HR file and proxy file the corresponding compressed timecode packet, while maintaining the files' original frame presentation timing;

(c) automatically verifying the timecodes in the HR file and proxy file timecode packets; and (d) if needing a repair of the HR file anomalous absolute timecodes, automatically correcting the anomalous absolute timecodes in the HR file timecode packets, thereby preserving the MPEG compliance and compressed audio/video data of the HR file and proxy file.

53. The method according to claim 52, wherein the step (d) further comprising a step for updating the absolute timecodes in the proxy file timecode packets.

54. The method according to claim 52, wherein the step (d) further comprising a step for updating absolute timecodes of each storyboard thumbnail for enabling frame-accurate composition of an edit decision list (EDL).

* * * * *

UNITED STATES PATENT AND TRADEMARK OFFICE
CERTIFICATE OF CORRECTION

PATENT NO. : 7,177,520 B2  Page 1 of 2
APPLICATION NO. : 09/850253
DATED : February 13, 2007
INVENTOR(S) : John Mark Zetts It is certified that error appears in the above-identified patent and that said Letters Patent is hereby corrected as shown below:

Title Page, Item (73) Assignee:

Substitute Assignee Name "IBM Corporation" with the full name --International Business Machines Corporation--.

Substitute claim 36 with the following claim, due to the USPTO printing errors made in col. 22, li. 59 through col. 23, li. 15:

--36. A method of processing a previously encoded MPEG video high-resolution (HR) file and corresponding proxy file, for frame accurate timecode repair and synchronization of individual video frames of the HR file and proxy file, comprising the following steps:
(a) for each video frame of the HR file and proxy file, creating a compressed timecode packet having an identifying signature, an absolute timecode of the frame, a relative timecode of the frame, a picture type and a picture reference, wherein the timecodes having the SMPTE timecode format HH:MM:SS:FF;
(b) modifying the HR file and proxy file by inserting in a header of each video frame of the HR file and proxy file the corresponding compressed timecode packet, while maintaining the files' original frame presentation timing;
(c) automatically verifying the timecodes in the HR file and proxy file timecode packets; and
(d) if needing a repair of the HR file anomalous absolute timecodes, automatically correcting the anomalous absolute timecodes in the HR file timecode packets, thereby preserving the MPEG compliance and compressed audio/video data of the HR file and proxy file.--

Substitute claim 39 with the following claim, due to the USPTO printing errors made in col. 23, li. 28-30:

--39. A system for processing a previously encoded MPEG video high-resolution (HR) file and corresponding proxy file, for frame accurate timecode repair and synchronization of individual video frames of the HR file and proxy file, comprising:
a computer coupled to an electronic storage device for storing the MPEG video files;
programming means, performed by the computer, for creating for each video frame of the HR file and proxy file, a compressed timecode packet having an identifying signature, an absolute timecode of the frame, a relative timecode of the frame, a picture type and a picture reference, wherein the timecodes having the SMPTE timecode format HH:MM:SS:FF;

UNITED STATES PATENT AND TRADEMARK OFFICE
CERTIFICATE OF CORRECTION

PATENT NO. : 7,177,520 B2
APPLICATION NO. : 09/850253
DATED : February 13, 2007
INVENTOR(S) : John Mark Zetts It is certified that error appears in the above-identified patent and that said Letters Patent is hereby corrected as shown below:

programming means, performed by the computer, for modifying the HR file and proxy file by inserting in a header of each video frame of the HR file and proxy file the corresponding compressed timecode packet, while maintaining the files' original frame presentation timing;
programming means, performed by the computer, for automatically verifying the timecodes in the HR file and proxy file timecode packets; and
programming means, performed by the computer, for automatically synchronizing the proxy file and the HR file absolute timecodes and relative timecodes in the timecode packets,
thereby preserving the MPEG compliance and compressed audio/video data of the MPEG video file.--

Substitute claim 40 with the following claim, due to the USPTO printing errors made in col. 23, li. 42 to 54:

--40. The system according to claim 39, wherein the means for automatically synchronizing the proxy file and the HR file absolute timecodes and relative timecodes in the timecode packets further comprising:
means for inserting a synchronization metadata into the proxy file, for signaling an offset and disparity in duration of the proxy file and HR file, a timecode repair action taken, and a timecode type identifying a source of the absolute timecode as chosen from a group comprising an original source timecode, repaired timecode, elapsed timecode or house timecode, and
means for marking affected frames of the proxy file as unviewable, when no corresponding frame found in the HR file.--

Signed and Sealed this

Tenth Day of June, 2008

JON W. DUDAS
*Director of the United States Patent and Trademark Office*